United States Patent [19]
Walton et al.

[11] Patent Number: 5,883,639
[45] Date of Patent: Mar. 16, 1999

[54] VISUAL SOFTWARE ENGINEERING SYSTEM AND METHOD FOR DEVELOPING VISUAL PROTOTYPES AND FOR CONNECTING USER CODE TO THEM

[75] Inventors: Thomas J. Walton; Kipper K. Fulghum; Thomas R. Batcha, all of Colorado Springs; Michael T. Juran, Highlands Ranch; Eric J. Kuzara, Colorado Springs, all of Colo.; Thomas F. Kraemer, Corvalis, Oreg.; Roy L. Johnson, Fort Collins, Colo.

[73] Assignee: Hewlett-Packard Company, Palo Alto, Calif.

[21] Appl. No.: 887,828

[22] Filed: Jul. 3, 1997

Related U.S. Application Data

[63] Continuation of Ser. No. 695,540, Aug. 12, 1996, abandoned, which is a continuation of Ser. No. 383,560, Feb. 2, 1995, abandoned, which is a continuation of Ser. No. 847,569, Mar. 6, 1992, abandoned.

[51] Int. Cl.$^6$ ..................................................... G06T 1/00
[52] U.S. Cl. .......................... 345/473; 345/433; 345/334; 345/349
[58] Field of Search ..................................... 345/418, 419, 345/473, 326, 474, 475, 333–335, 348–349, 351, 433

[56] References Cited

U.S. PATENT DOCUMENTS

| | | | |
|---|---|---|---|
| 4,827,404 | 5/1989 | Barstow et al. | 364/200 |
| 4,870,561 | 9/1989 | Love et al. | 364/192 |
| 4,901,221 | 2/1990 | Kodosky et al. | 364/200 |
| 4,914,568 | 4/1990 | Kodosky et al. | 364/200 |
| 5,041,992 | 8/1991 | Cunningham et al. | 364/518 |
| 5,261,041 | 11/1993 | Susman | 395/152 |
| 5,261,820 | 11/1993 | Slye et al. | 434/43 |
| 5,485,600 | 1/1996 | Joseph et al. | 395/500 |

OTHER PUBLICATIONS

"VAPS by Example", Copyright Owned by Virtual Prototypes Inc. Publication I.D.: 39, Revision O, Dated Jul. 5, 1991.

"VAPS–Conceptual Overview", Virtual Prototypes, Inc., May 17, 1991.
"Creating Graphical Interfaces Through Graphical Interaction", Singh et al., Oct. 6, 1990.
"Suit: Software User Interface Design Tool", Kishi et al., Sep. 13, 1991.
"Linked–List Visualization for Debugging", Shimomura et al., May 1991.
"Visual Programming in a Computer Animation Environment", Van Reeth et al., Oct. 6, 1990.
"Visualization of Experimental Systems", Haarslev et al., Oct. 12, 1988.

(List continued on next page.)

*Primary Examiner*—Joseph H. Field

[57] ABSTRACT

A system for providing a simple, easy to learn and flexible means of creating user interfaces to products under development without the need of a programming language or the need to learn a large set of complicated commands. The Visual Software Engineering ("VSE") system of the invention uses a simple concept of defining both input to and output from graphical objects in an object-oriented system by providing examples of what the user desires the graphical object to do. This technique is referred to herein as "animation by example". In accordance with this process, the user creates a user interface by drawing the user interface with a graphics editor and then defining the output behavior (i.e., graphics manipulation) of the user interface components by showing each state or frame as an animation. This is accomplished by changing the object using a graphic editor function such as move or rotate and storing each of the frames with the object as a behavior state. Just as with defining the output, the input is defined by giving the graphic object an example of what type of input to look for, and once it finds that input, it tells the object which frame to output or change to. Application code can then drive the animation or read the input by accessing the frame numbers assigned to each of the example frames.

39 Claims, 19 Drawing Sheets

Microfiche Appendix Included
(3 Microfiche, 229 Pages)

OTHER PUBLICATIONS

"VPL: An Active, Declarative Visual Programming System", Lau–Kee et al., Oct. 11, 1991.

"CIAO: A Powerful Synchronisation & Controlling Mech. for Human Computer Interfaces", Papageorgiou Oct. 11, 1991.

"Vaps Conceptual Overview," Virtual Prototypes Inc., May 17, 1991.

"Creating Graphical Interfaces Through Graphical Interaction," Singh, et al. Oct. 6, 1990.

"Suit: Software User Interface Design Tool," Kish, et al., Sep. 13, 1991.

"VPL: An Active, Declarative Visual Programming System," Lau–Kee, et al., Oct. 11, 1991.

"CIAO: A Powerful Synchronisation & Controlling Mechanism for Human Computer Interfaces," Papageorgiou Oct. 11, 1991.

Proceedings of the European Computer Graphics Conference and Exhibition (Eurographics '89), 4 Sep. 1989, Hamburg, FRG pp. 3–14, Oijing Mao: "Micro–UIDT: A User Interface Development Tool".

Research Disclosure No. 317, Sep. 1990, Emsworth, GB, p. 749 Disclosure No. 31761 "Intelligent Object–Oriented Graphics".

IEEE Software, vol. 6, No. 3, May 1989, New York, US, pp. 15–23, Brad A. Myers: "User–Interface Tools: Introduction and Survey".

VSE OBJECT INPUT DEFINITION

VSE OBJECT
BEHAVIOR DEFINITION

BEHAVIOR ROUTER 412

EXECUTION OF
OUTPUT BEHAVIOR

BEHAVIOR EVENT RECEIVER
FOR USER APPLICATION

Fig. 12  CLIENT SERVER 414

BEHAVIOR RECORDER 418

BEHAVIOR PLAYER 418

EXAMPLE MOUSE

EXECUTION OF INPUT BEHAVIOR OF OBJECT

VISUAL SOFTWARE ENGINEERING SYSTEM AND METHOD FOR DEVELOPING VISUAL PROTOTYPES AND FOR CONNECTING USER CODE TO THEM

CROSS-REFERENCES TO RELATED APPLICATIONS

This is a continuation of application Ser. No. 08/695,540, filed Aug. 12, 1996 (abandoned), which was a continuation of application Ser. No. 08/383,560, filed Feb. 2, 1995 (now abandoned), which was a continuation of application Ser. No. 07/847,569, filed Mar. 6, 1992 (now abandoned), all of which are incorporated by reference herein for all that they disclose.

COPYRIGHT NOTICE & AUTHORIZATION TO COPY MICROFICHE APPENDIX

A portion of the disclosure of this patent document (APPENDIX A) is available on microfiche (3 microfiche, frames 1–229) and contains material which is subject to copyright protection. The copyright owner has no objection to facsimile reproduction by anyone of the patent document or the patent disclosure, (including microfiche APPENDIX A) as it appears in the Patent & Trademark Office patent file or records, but otherwise reserves all copyright rights whatsoever.

BACKGROUND OF THE INVENTION

1. Field of the Invention

The present invention relates to a graphical user interface design tool for creating interactive graphical user interfaces for hardware instruments and real-time systems such as VCRs, digital voltmeters, automobiles, and the like.

2. Description of the Prior Art

Most consumer products require some type of user interface. For example, automobiles have a speedometer and a steering wheel, while VCRs have switches and knobs and digital voltmeters have pushbuttons and LED read-outs. Such user interfaces often determine the market success of a consumer product because it is the primary point of interaction between the consumer product and the end user. As a result, without a user interface which enables the end user to properly interact with the product, even a technologically sound product will be rendered virtually useless to the end user.

To overcome this problem, product developers have often created physical prototypes which they employ to test the usability of the product and the product's interface. Typically, this is done before the product goes into final production. However, since creating a physical prototype requires the manufacture of physical components, building a physical prototype is an expensive and slow process. In fact, since the prototype often cannot be built until the underlying product is operational, the interface to the user has often delayed the introduction of the product.

In an effort to save time and money, product developers have relatively recently begun to create graphical, software versions of their interfaces that may be employed to test the usability of their proposed product and interface. While such "simulated" user interfaces have sped up the prototyping process, such "simulated" user interfaces have also taken a great deal of time to create. Moreover, such "simulated" user interfaces have required computer graphics experts for their creation. In the face of the increasing software cost for the development of many consumer products, the use of computer graphics experts to create such "simulated" user interfaces is no longer cost effective.

A number of software tools, such as prototyping tools, system modeling tools, and system simulation tools have been used by such computer graphics experts for creating such "simulated" user interfaces in order to prove concepts and test ideas with end users. Such tools typically provide some form of animation of the models created so that the system "runs" in a manner similar to the final system. Such systems thus permit the product developer to build a "running" model of a proposed system to show to an end user in order to get feedback on the product requirements. Ideally, such a system provides the "running" model without requiring additional "code" to be written while also providing the product developer with some aids for partitioning the system into its eventual hardware and software components. However, since the animation of a such a "simulated" prototype is provided by specifying the system behavior via unique, proprietary languages that must be learned by the product developer or implemented by a computer graphics expert, the resulting system is not reusable as the product moves into implementation, typically does not allow the developer to readily create custom graphics, and unduly adds to the expense of product development.

More recently, graphics systems have been developed that allow product developers to graphically create user interfaces by picking and placing pre-programmed graphical user interface components such as sliders or knobs on the display screen. However, the number of components available for such prior art systems is limited and the behavior of the interface components is limited to what the original creator of the components required. As a result, if a new or custom component needs to be added, then a graphics programming expert is still required to create the custom component. Also, the existing interface components of such systems are very difficult to change or modify.

Such prior art graphics tools are typically referred to as user interface toolkits, user interface builders, and user interface management systems. Such graphics tools aid the product developer with the creation of screen-oriented human interfaces which the product developer can then use to create the actual interface to be included with the product. Development of such screen-oriented human interfaces has been simplified by providing automatic generation of the code required to create a "production" interface; however, such graphics tools are specifically designed to meet the needs of only those product developers creating applications that have screen-oriented interfaces, as is typical of information systems. A system with a more general purpose application is desired.

The latest prior art graphics systems allow product developers to create output behavior (animation) for user interface objects by drawing the object with a graphical editor and then animating the object by textual description. Such systems require the input behavior (such as how the graphical object receives and processes mouse or keyboard events) to be described textually or using some type of computer language. These input objects have also been limited to several specific types of input objects such as sliders or knobs. For example, a system of this type referred to as the SL-Graphical Modeling System (SL-GMS®) is available from SL Corporation. The SL-GMS® system purportedly allows programmers and non-programmers to use a drawing tool to design portable application interfaces, to connect screen objects to external data sources, to animate screen objects to reflect real-time changes in application data, and to use screen objects to control the application.

The SL-GMS® system is a development system for use in building and managing graphics screens that can be embedded in a user application. The SL-GMS® system uses object-oriented architecture to provide direct, table-driven access to application data and over 40 pre-defined actions for screen objects. A drawing tool is also provided for creation of custom screen objects using a set of "building blocks" that the developer can use for modifications and extensions by calls to a function library. A mouse-driven graphics editor is also provided which allows users to create graphical objects and to position them on the screen. For example, a meter or gauge can be constructed from objects such as rectangles, lines and text. Once created, the appearance of each object can be modified by using the graphics editor to vary such standard graphical attributes as color, line width, fill percent and style, size, rotation, position and text font. Graphical attributes which can be specified by the graphics editor of the SL-GMS® system can also be modified dynamically to reflect changes in external data. For example, this may be accomplished by causing the needle of a meter to rotate within a specified range as an external data variable changes. Also, a hierarchical, object-oriented approach is used to allow properties to be attached to all "instances" of the graphics elements. Functions then may be specified by the graphics editor to animate screen objects by establishing direct connections between the screen elements and application database variables. In this manner, screen objects may be animated using real-time data by the approximately 40 graphical action attributes allowed by the system. However, the SL-GMS® system is limited in that the output and input behavior must be described textually. An improved system is thus still desired which may be easily used by direct manipulation.

Other systems, such as the Dataviews® Graphics Software from V.I. Corporation, the Virtual Prototyping System (VAPS®) from Virtual Prototypes, Inc., the AC-100 System from Integrated Systems, Inc., and the Action!® System from ExperTelligence, Inc., have also been developed to allow a user to provide animated graphics in response to outputs from an application program. However, none of these systems allow definition of graphical input or output to the system in a completely graphical way. A system which is easy to use by direct manipulation of the objects is still desired.

In addition to their difficulty of use, prior art graphical prototype development systems also have limitations in that they cannot break up hierarchial objects into their smaller components and cannot connect application code while the graphics editor is running. In addition, libraries of components have been difficult to use and create. A system with these and other features which is simple, easy to learn and flexible is desired. The present invention has been designed to meet these needs.

SUMMARY OF THE INVENTION

The present invention meets the above-mentioned needs in the art by providing a simple, easy to learn and flexible means of creating graphical user interfaces without knowledge of programming languages and without having to learn a large set of complicated commands. Instead, the Visual Software Engineering ("VSE") system of the invention is premised on the simple concept of defining both input to and output from the graphical user interface by having the user provide examples of what he or she intends the object to do in response to certain user application inputs. The technique of the invention may be thought of as an extension of the aforementioned graphical prototype development systems to include "animation by example".

When designing a user interface in accordance with the present invention, the interface developer creates the desired user interface by first drawing the user interface with a graphics editor. The user then defines output behavior of (or animates) the user interface components by showing each state or frame of the animation. This is accomplished by changing the graphical objects in the user interface using a graphics editor function such as move or rotate and then storing with the graphical object in an object-oriented database each of the changed states of the graphical object as respective "frames" of graphical information. In the process of creating these states, the user may assign a frame name and a number to a series of stored frames as a behavior function. Also, just as with defining output (or animation), the input may be defined by giving the graphical object an example of what type of input to look for. Then, once the graphical object finds that input, the graphical object is told which frame to output or change to. Application code can then drive the animation or read the input by accessing the frame numbers assigned to each of the example frames. Such application code may be code running on a host, in an instruction set simulator, or in the physical device, for example. This allows users to migrate their application code from host to simulation to emulation.

All graphical objects that are created in accordance with the invention can be stored in a library and reused. They can also be retrieved from the library, changed or customized through normal graphics editing commands, and then stored in the library as a new component. The user can also store the entire design of his or her user interface on disk and save the commands that are entered during the development of the interface so that these commands also can be replayed at a later time. Also, the system of the invention may also use interpolation when defining input and output behavior and may also provide a multiple view graphical editor. In addition, hierarchial objects may be created whereby individual elements of the hierarchy may always be accessed.

In accordance with a preferred embodiment of the invention, a system is provided for creating and animating graphical objects by directly manipulating the graphical objects on a display screen. Such a system preferably comprises a graphics editor for creating and manipulating the graphical objects on the display screen under user control and means for animating the graphical objects by storing information representing manipulations of the graphical objects as respective behavior states of the graphical objects and recreating the manipulations by specifying the corresponding behavior states of the graphical objects. The animated graphical objects are then displayed on the display screen. In the preferred embodiment, the animating means comprises a behavior editor which defines what input behavior a graphical object has by selectively mapping a user defined input region, behavior state name and value to a user input operation and which defines what output behavior a graphical object has by mapping the current behavior state of each graphical object to a user defined output state name and value. The behavior editor may also comprise means for sending a given behavior state to the graphical objects by specifying the output state name and value.

In a preferred embodiment of the invention, the animating means comprises an example mouse input device with an associated example mouse pad for defining operations done with a hardware mouse input device with an associated hardware mouse pad. The example mouse comprises a graphical mouse object representing the hardware mouse with the associated hardware mouse pad on the display screen and means for manipulating the graphical mouse object so as to simulate the operation of the hardware mouse. Preferably, the manipulating means comprises means for pressing and releasing one or more buttons on the example mouse pad under control of the hardware mouse and associated hardware mouse pad, whereby a button to be depressed on the example mouse pad is selected by the user by using the hardware mouse and the button on the example mouse pad is depressed by the user by depressing a corresponding button on the hardware mouse pad. The manipulating means preferably also comprises means for moving the example mouse on its associated example mouse pad under control of the hardware mouse and associated hardware mouse pad. As a result, the example mouse is selected by the user by using the hardware mouse and is moved by moving the hardware mouse such that the example mouse is moved a corresponding amount on its associated example mouse pad on the display screen relative to the movement of the hardware mouse.

Preferably, the present invention further comprises an interface for linking the behavior states of the graphical objects created by the graphics editor to user defined source code or an external database.

The scope of the invention also includes a method of creating and animating graphical objects by directly manipulating the graphical objects on a display screen. Such a method in accordance with the invention preferably comprises the steps of:

drawing desired graphical objects with a graphics editor;

manipulating the desired graphical objects to different display states;

defining desired output behavior for the desired graphical objects for different input states of the desired graphical objects;

storing the defined output behavior with the corresponding graphical object for respective input states; and animating the graphical objects by designating display states to be displayed and then displaying the designated display states in a desired order as an animation.

Preferably, the manipulating step of the method of the invention comprises a step of moving, rotating, scaling, stretching, cutting, filling, pasting, mapping or unmapping the graphical object. Also, the animating step preferably comprises the step of using an example mouse input device with an associated example mouse pad to define operations done with a hardware mouse input device with an associated hardware mouse pad. Preferably, the manipulating step of the method of the invention comprises the steps of pressing and releasing one or more buttons on the example mouse pad under control of the hardware mouse and associated hardware mouse pad. This can be accomplished by selecting a button to be depressed on the example mouse pad using the hardware mouse and depressing the button on the example mouse pad by depressing a corresponding button on the hardware mouse pad. At this time, the example mouse can be moved on its associated example mouse pad under control of the hardware mouse and associated hardware mouse pad by selecting the example mouse using the hardware mouse and moving the hardware mouse such that the example mouse is moved a corresponding amount on its associated example mouse pad on the display screen relative to the movement of the hardware mouse.

The invention also preferably comprises a method of defining user input to graphical objects as respective behavior states of the graphical objects. In accordance with the invention, such a method comprises the steps of:

defining at least one region on a display screen relative to each graphical object which may receive user input;

describing what input event types for the at least one region relative to each of the graphical objects can simulate output behavior states of the graphical objects which control output behavior for the graphical objects;

defining desired input behavior states for the graphical objects which can simulate the output behavior states of the graphical objects;

storing the defined input behavior states with corresponding graphical objects for respective output behavior states; and stimulating the graphical objects with the defined input behavior states so as to cause a change in at least one output behavior state of at least one of the graphical objects, thereby changing a display state of at least one of the graphical objects.

Such a method in accordance with the invention may also further comprise the step of retrieving graphical objects with pre-defined input behavior states from a library and assigning input behavior of the retrieved graphical objects to the graphical objects being described in the describing step.

The VSE system of the invention so designed saves development time and cost in that the software interface eliminates the need to develop early hardware prototypes to demonstrate the appearance and behavior of the system. The software interface is also much easier, far less expensive, and less time consuming to modify than a hardware implementation. It can also be readily tailored to a particular problem domain by modifying or adding components. A software interface is also easily connected to the actual code being constructed by the developer, where such code may be running on the development host, in an instruction set simulator on the host, in the physical product's processor, or on all three at once. The system of the invention also eliminates the requirement to learn new abstract languages and can be used during early tests since the product developer can begin writing tests for the user interface during the development of the associated product.

The present invention is preferably designed using an object based technology where a drawn shape is a separately movable object. A "palette" of standard objects may also be supplied which can be graphically "grabbed" and copied into the user's work area for further manipulation. Mouse events that occur over these objects will cause the objects to execute their internal behavior. For example, a mouse click over a "button" object may cause the button to invert its border colors to simulate the button being pressed. In addition, the user can interactively define the behavior of an object in response to an input value from a target application or via such mouse events and can automatically log for recording and playback the input events and resultant responses for the output objects. This enables the invention to be used for full product testing and creation of automated demos.

BRIEF DESCRIPTION OF THE DRAWINGS

The objects and advantages of the invention will become more apparent and more readily appreciated from the following detailed description of the presently preferred exemplary embodiment of the invention taken in conjunction with the accompanying drawings, of which:

FIG. 9(a) illustrates a flow chart for passing behavior state names and values to registered objects and FIG. 9(b) illustrates a flow chart for searching for registered behavior states.

DETAILED DESCRIPTION OF THE PRESENTLY PREFERRED EXEMPLARY EMBODIMENT

Figure 1:
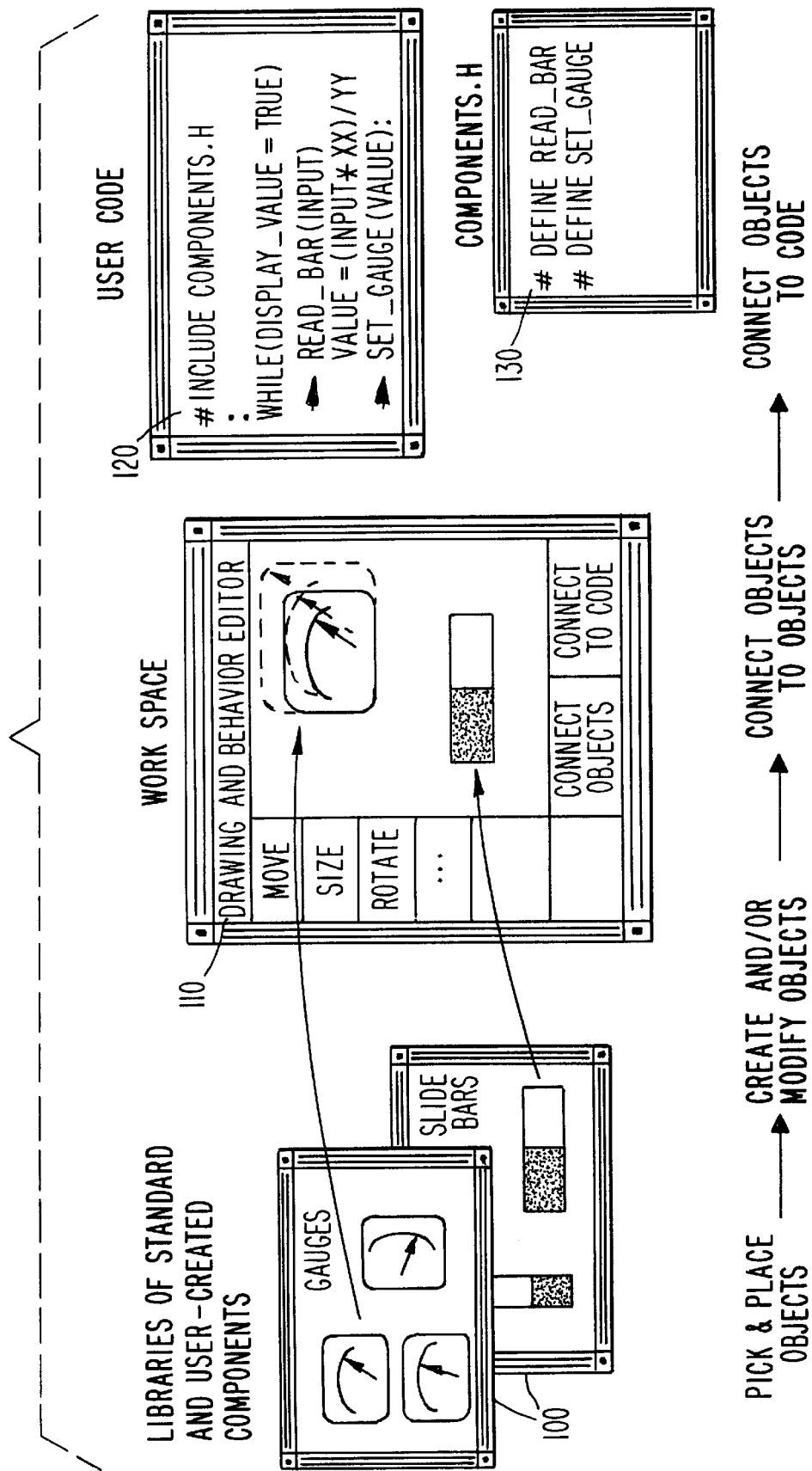
FIG. 1 illustrates a conceptual block diagram of a Visual Software Engineering ("VSE") system in accordance with the invention.

A visual software engineering system with the above-mentioned beneficial features in accordance with the presently preferred exemplary embodiment of the invention will now be described with reference to FIGS. 1–17. It will be appreciated by those of ordinary skill in the art that the description given herein is for exemplary purposes only and is not intended in any way to limit the scope of the invention. Since UNIX® work stations are in widespread use as developmental platforms in real-time projects, the preferred embodiment of the invention is described for use on UNIX® work stations. Also, since C and C++ computer languages are the primary implementation languages of interface developers, the source code listings attached as APPENDIX A have been prepared in these languages. However, those skilled in the art will appreciate that other platforms and languages may be used as well. Accordingly, all questions regarding the scope of the invention should be resolved by referring to the appended claims.

The present invention relates to a system for designing a prototype of a user interface to a product without actually having to build a hardware user interface. In particular, a custom graphics display is developed in accordance with the invention so that operation of the prototype product may be viewed before the product is actually built. As a result, the user may design and test a proposed interface without building a prototype. As will be described in more detail below, the present invention allows the user to animate custom graphical objects by providing input by example and creating frames representing the desired output behavior (or animation).

In accordance with the invention, an animation window is created which allows the user to assign a behavior function name to a graphical object and then manipulate the graphical object using a graphics editor to illustrate by example what the designer wants that particular graphical object to do. The present behavior of the manipulated graphical object is then stored as a behavior state with the current manipulation (display state) of the graphical object. In this manner, the designer creates "frames" of animation which may be later called upon to create the desired sequence of actions. In particular, the user software may be used to access the graphical object, and by providing the behavior function name and the desired behavior state, the graphical object may be manipulated on the display screen directly from the user application code. Since the animation thus may be created by example, the designer need have little or no skill in the operation of a graphics system.

The present invention is particularly advantageous in that the user application code can read input and send output to the display screen using the created graphics objects without requiring the designer to write interface code. Also, the user application code can take the user defined animation input from the screen, process it, send it back to the screen and see the change in the animation. In this manner, change to the system may be made "on the fly" by a person with little or no graphics skill.

VSE objects in accordance with the invention thus store behavior as well as graphics information. This behavior information may represent any possible graphics transformation of a graphics object, such as change of color, move, rotate, scale, stretch, fill, map, unmap, raise and lower. In other words, any transformation that the graphics editor can perform can be stored as a behavior state of the graphics object. As will be described below, the VSE objects may be grouped into composite objects and then treated as a single object for purposes of defining behavior and the like.

FIG. 1 illustrates a conceptual block diagram of the VSE system of the invention. As illustrated, the interface designer picks graphical objects from libraries 100 of standard and user-created components and places these graphical objects in drawing and behavior editor 110. These components typically include gauges or slide bars and the like for representing the output of a device such as a VCR, for example. The interface designer next creates and/or modifies the graphical objects in the drawing and behavior editor 110 as desired using the available functions of the graphics editor of the designer's computer system. The resulting objects are then stored as objects in an object-oriented database system and connected to other objects or user code 120 in accordance with techniques commonly used in object-oriented systems. The information so stored is accessed by the user code 120 by referring to the definitions 130 of the object-oriented components and communicating to a client server via an interprocess communications mechanism of a type known to those skilled in the art. The information so obtained is then utilized in the user's program in accordance with conventional object-oriented programming techniques.

Figure 2:
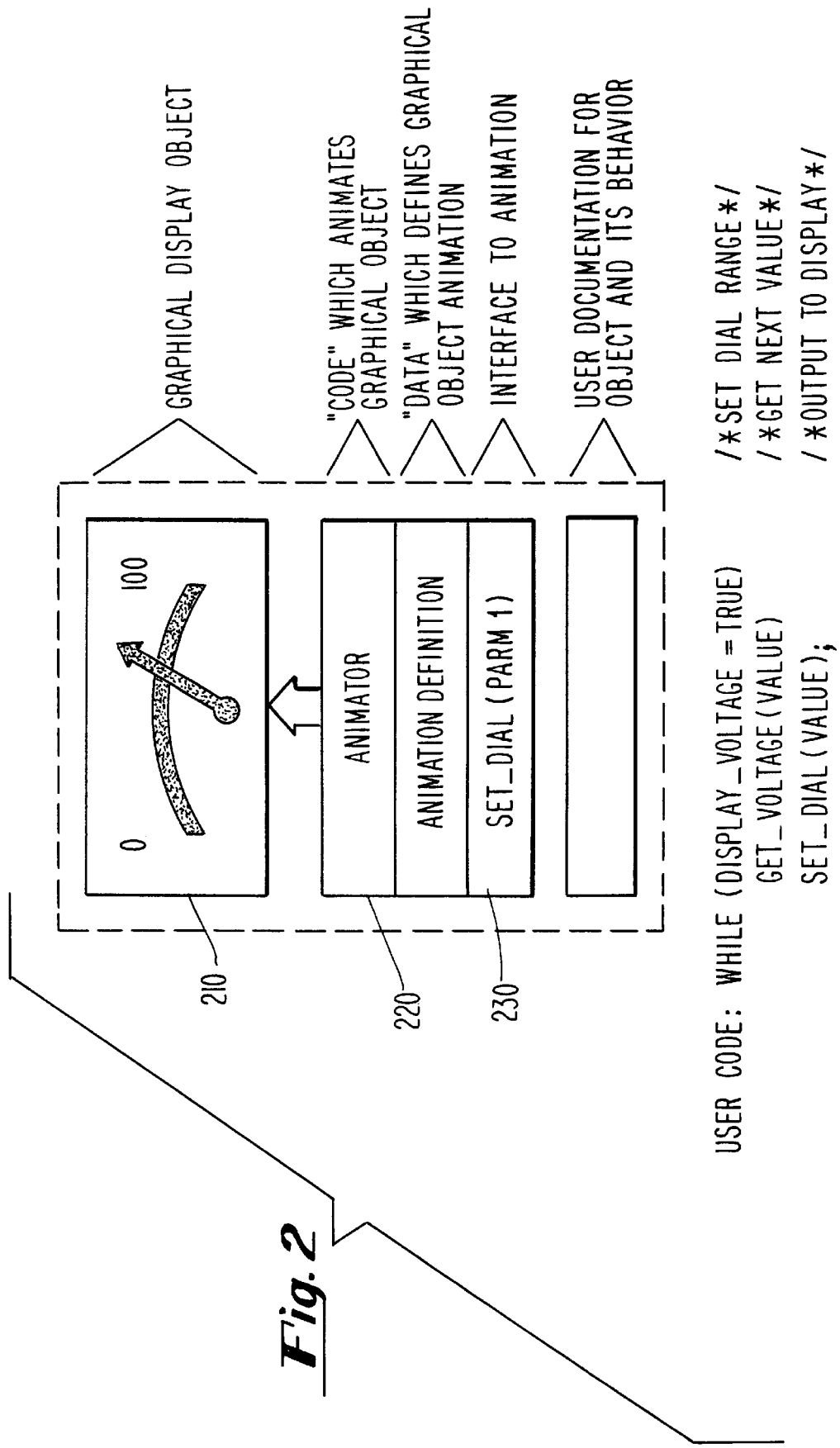
FIG. 2 illustrates a software interface for interfacing a graphical display object to underlying user code in accordance with the invention.

FIG. 2 illustrates an example in which a gauge 210 is selected as the graphical display object for use in the proposed interface. As illustrated, animation code 220 is provided for animating the graphical object for display in accordance with the animation data which defines the graphical object animation. As illustrated, the user program preferably includes an interface 230 for accessing this animation information and for calling the object and its associated behavior and behavior value for the chosen animation.

Figure 3:
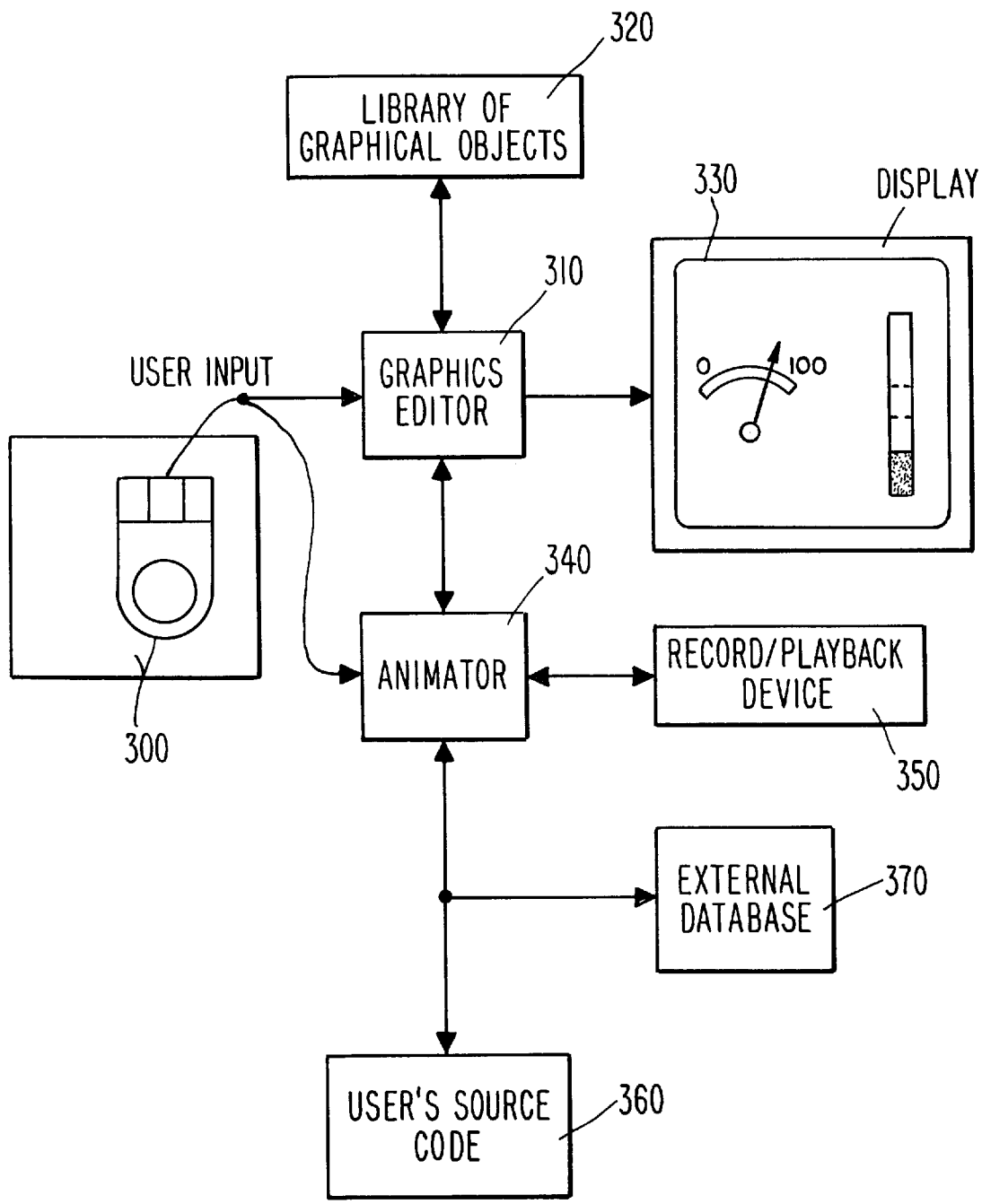
FIG. 3 illustrates a block diagram of a preferred embodiment of the invention.

FIG. 3 illustrates a block diagram of a preferred embodiment of the invention. As illustrated, user input is provided by a mouse or keypad 300 and the like to graphics editor 310. As will be described in more detail below, the graphics editor 310 is the part of the VSE system that allows the user to draw graphics on the screen and to create, delete and manipulate objects on the screen. As illustrated in FIG. 3, a library of graphical objects 320 is also provided for storing VSE graphical objects (hereinafter referred to "Palettes") which can be read into the graphics editor 310 and manipulated by the user. The resulting graphics images are displayed on a display 330 so that they can be observed by the user during runtime.

The invention of FIG. 3 is particularly characterized by an animator 340 which allows the user to define by example what input and output behavior states a graphical object should have. As will be described in more detail below, this is accomplished by storing the corresponding input and output behavior and display states with the graphics object and then selectively recalling this information for display on display 330 as an indication of what output change will result for a particular change in the input to the interface. As will also be described in more detail below, a record/playback device 350 is also preferably provided to allow the user to record and play back commands and behavior events which occur during runtime. This feature of the invention allows the user to create a demo for illustrating the output of the device in different circumstances. In addition, the behavior states of the graphical objects created by the graphics editor 310 may also be linked to user source code 360 such that the source code 360 can manipulate the states of the graphical objects. For this purpose, the user may access the stored behavior function and values for both input and output. For example, for a dial which is to be given behavior, animator 340 may generate "#define set_dial (value) vse_send_event ("dial", value)". This allows the user application program to call "set_dial" instead of "vse_send_event". The behavior states can also be stored in external database 370.

A presently preferred embodiment of the invention will now be described with respect to FIGS. 4–17.

Figure 4A:
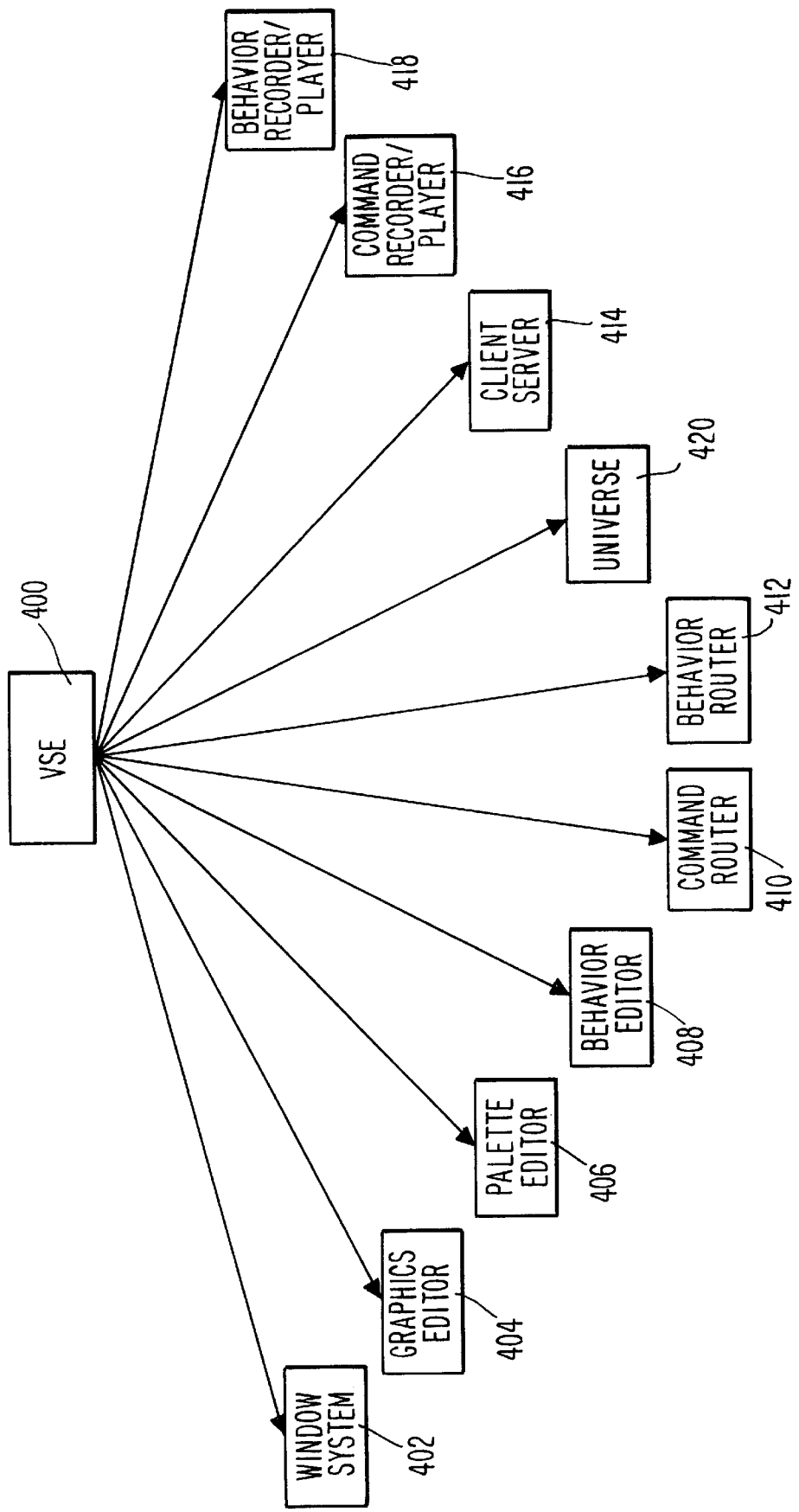
FIGS. 4(a) and 4(b) together illustrate the respective software modules for implementing the embodiment of the invention of FIG. 3.

FIG. 4(a) illustrates the modules of the VSE system 400 of the invention. As will be more apparent from the following, the VSE system 400 is preferably implemented in software on a computer and is accessed via a window system 402. As illustrated, the primary components of VSE system 400 are graphics editor 404 for drawing and manipulating graphical objects on the display, palette editor 406 for allowing the user to create and manage libraries of graphical objects, and a behavior editor 408 for allowing the user to define what input and output behavior states a graphical object has. A command router 410 and behavior router 412 are provided to route commands and behavior events, respectively, to various parts and objects within the VSE system 400, while client server 414 is provided for connecting the user code to the VSE system 400. Also, a command recorder/player 416 and a behavior recorder/player 418 are provided to allow the user to record and playback commands and behavior events.

Figure 4B:
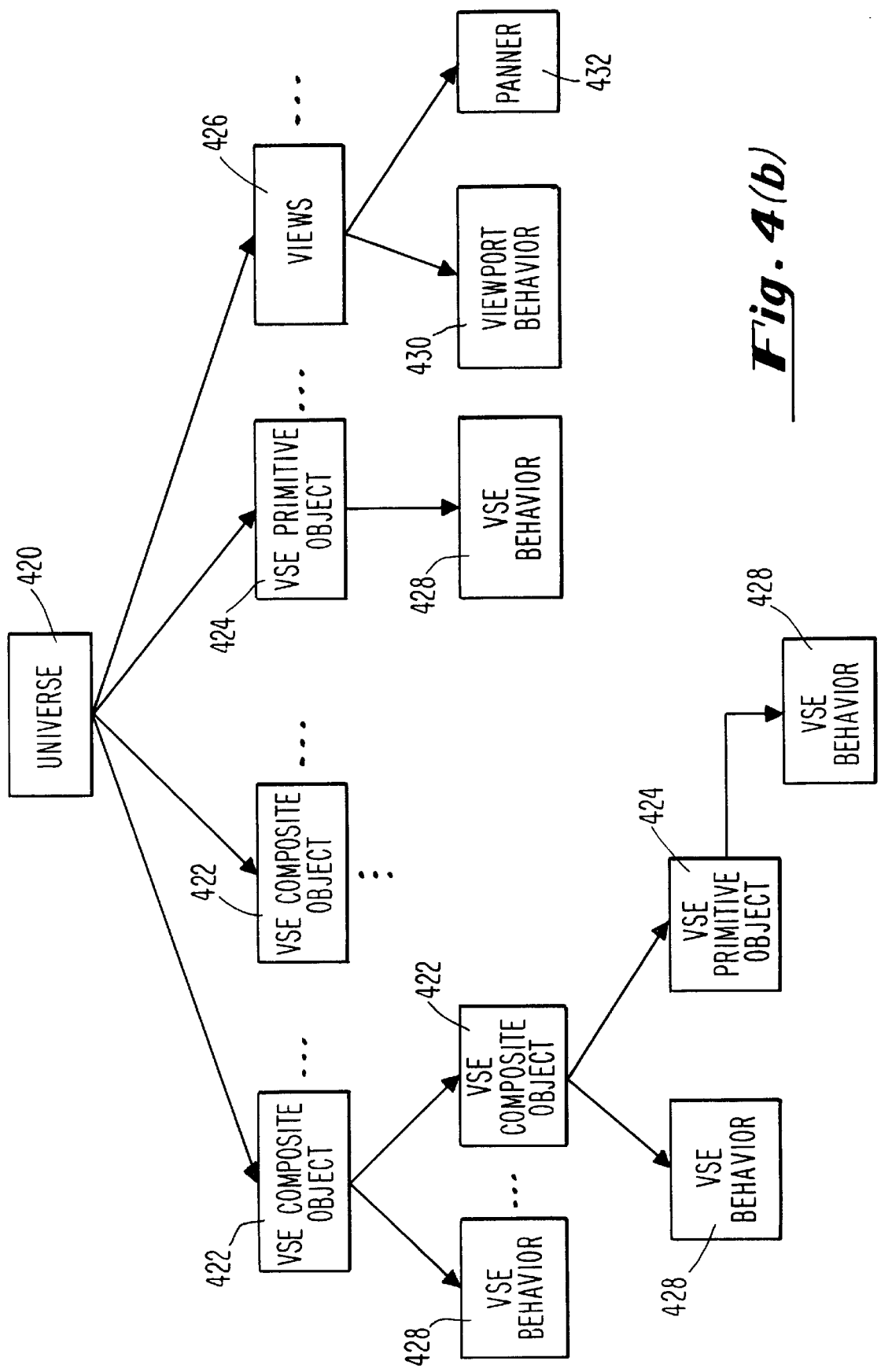

Universe 420 is also provided as a place for storing all VSE graphical objects. As illustrated in FIG. 4(b), the universe 420 includes a plurality of VSE composite objects 422, which are object-oriented elements which make it possible for graphical objects to be built in a hierarchical fashion. VSE primitive objects 424 are also provided for representing an object that the user has drawn on the display. View objects 426 are provided to give the user different views into the universe 420. In addition, VSE behavior objects 428 are provided for storing the behavior for each behavior state of an object. View port behavior objects 430 are also provided for storing the behavior that a particular view object 426 can have. Finally, a panner object 432 is preferably provided to allow the user to change the viewing position of the view objects 426 into the universe 420 and the scale at which the view objects 426 are operating.

A detailed description of each of the modules of FIGS. 4(a) and 4(b) will now be given a source code listing of the following preferred embodiment of the VSE system 400 of the invention is available as microfiche APPENDIX A and will be described in detail below.

Window System 402

The window system 402 of the VSE system 400 of the invention is an interface to a window system that the VSE system 400 gets displayed in when run. The main function of the window system 402 is to isolate the window programming of the host such that when the window system is changed only window module 402 has to change and not the rest of the system. The specific designs of such window systems are believed to be well within the skill of those skilled in the art.

Graphics Editor 404

The graphics editor 404 is the part of the VSE system 400 of the invention that allows the user to draw graphics on the display. Graphics editor 404 allows the user to create, delete, and manipulate objects on the display, group those objects to build composite objects, and select groups of objects or sub-objects and manipulate those. Manipulation is defined herein to be any of following: moving, rotating, scaling, stretching, cutting, filling, pasting, mapping, unmapping or any other graphical manipulation allowed by the graphics editor 404. The graphics editor 404 thus has all of the features that one skilled in the art would expect from a drawing program.

The graphics editor 404 is responsible for the creation and modification of all custom graphic objects within the VSE system 400. It preferably provides, in an object-oriented way, all the features the user expects in an ordinary stand-alone drawing program such as "Drawing Gallery®" available on the IBM-PC and xgedit® or idraw on Hewlett-Packard workstations. Using the graphics editor 404 of the invention, the user preferably has the capability to draw and paint, in detail, any picture with a wide selection of shapes, colors, and textures. In addition, the user may also graphically manipulate, store and retrieve the graphical objects of the picture once they are created.

The graphics editor 404 of the invention deals with the graphical representation of objects. All operations and manipulations refer to these objects, and all drawing or painting activities create and modify the representations. The user may be presented with operations that use "regions" of the work area, but these regions are generally handled internally as either objects or parts of objects. Preferably, an object's graphical representation is hierarchical in nature, meaning that its sub-components are in and of themselves objects. Because of this, any composite object can be treated as a single object, or components can be accessed individually. However, in reality, a composite object has no graphical representation other than as the sum of its parts.

The graphics editor 404 creates the graphics for an object, but generally that is all. Once created, the graphical object is responsible for controlling itself, and the graphics editor 404 simply makes requests of the graphical object. During operation, the graphics editor 404 queries the universe 420 to determine what object it is dealing with (i.e., what graphical object is selected), and then asks the object itself what requests are legal. The graphics editor 404 then dynamically updates its "menu" to reflect the graphical object's capabilities. The graphics editor 404 also manages the work area, or main window, where objects are created and manipulated. For this purpose, the graphics editor 404 makes sure that all views (when the graphics editor 404 supports multiple views) of the objects are always current.

The graphics editor 404 in a preferred embodiment of the invention manages two types of files, a graphical file and a design file. The graphical file is created to store the graphical representations of objects for displaying or printing the appearance of those objects, while the design file contains the information the graphical file does along with descriptions of object relationships and object behavior functions. In other words, the graphical file stores pictures of objects, while the design file stores the appearance and behavior of objects.

Because the VSE system 400 of the invention may be an integral part of the final product as well as a tool to create the final product, the VSE system 400 will preferably have two modes that greatly influence the behavior and appearance of the graphics editor 404. Edit mode is a mode in which the graphics editor 404 appears with all of its menus and palettes to allow the user to create a picture or model. In run mode, however, these menus and palettes disappear to let the user exercise the created model with no indication that the VSE system 400 or the graphics editor 404 is present. Thus, in essence, the appearance and behavior of the VSE system 400 in run mode is the final product.

Those skilled in the art will appreciate that the graphics editor 404 of the invention may have a variety of operational features which allow the user to "drive" the graphics editor 404. Such administrative features that provide the user with control of the graphics editor 404 and the view or views the graphics editor 404 has of the graphical objects it is dealing with may be varied. For example, a preferred embodiment of the graphics editor may have, without limitation, the following functions:

Clear: The clear function clears the work area of all objects. A region of the work area may also be cleared by using a "rubber-band box" mechanism.

Select: The select function selects an object or objects to apply drawing, painting or manipulations to. When an object is selected, additions or deletions that are done apply to that object. Likewise, manipulations such as scaling and rotating refer to the selected object. Since graphical objects are preferably hierarchical, such manipulations usually refer to all sub-objects as well. In a preferred embodiment of the invention, the VSE system 400 indicates that an object or set of objects is currently selected by drawing "handles" on the borders of the selected object or objects.

Open view: This function is used to support multiple views into the work area of graphics editor 404. In other words, more than one window displaying the graphical objects can be created. For example, one view may be zoomed in on a particular region, while another is panned to a different portion of the work area. Regardless, if an object is created, modified or manipulated in one view, it will be in all other views, whether it is currently visible or not.

Cut/Copy/Paste: This function will enable the user to cut/copy/paste regions or objects from or to the work area.

Group/Ungroup: This function allows the user to create or dismantle composite objects or treat multiple objects as one for whatever operation is to be done.

Front/Back: This function moves an object or objects in front of or behind all other objects in the work area.

Grid: The grid function allows the user to place objects accurately in the work area. Preferably, one grid is used for each VSE view.

Import/Capture: These functions enable the graphics editor 404 to import graphics created outside the VSE system 400 with other tools. Multiple file formats may be supported, and the graphics editor 404 should be able to "capture" graphics so that a user can select a window outside the graphics editor 404 and copy the image into the work area.

Save/Restore: This function is used to maintain the graphical and design files which are created and read by the graphics editor 404. If just a picture is required, the user would save to or restore from a graphical file. However, if object functionality is to be retained, the design file would be used.

Undo/Redo: This function allows the user to back up or go forward in a graphical command queue, one command at a time. As a result, if a mistake is made editing an object, the user can undo back to the point where the mistake was made.

Pan and Zoom: Since the work area may be larger than that which can be displayed on the screen, the user is given these functions for moving around in the work area. With the panner, the user can select a region of the work area to work with, while the zoom feature allows the selection, via a "rubber-band box" or separate "zoom" buttons, a small portion of the work area to be magnified.

Print: This function allows the graphical representations of views to be dumped to a printer.

Refresh: This function simply refreshes the screen so that all objects including the view or views are told to redraw themselves.

Manipulation features of the graphics editor 404 allow the graphics editor 404 to operate on objects themselves or regions of the work area. They may change appearance, location or orientation of objects in the work area, but they do not change the basic graphical nature of objects like drawing and painting activities do. Sample manipulation functions include a move function, a scale function, a stretch function, a rotate function, a smooth/unsmooth function and a fill function, although those skilled in the art will appreciate that other manipulations of graphical objects may be used.

The drawing features of graphics editor 404 provide the basis for creating the graphical representation of an object. The overall look and shape of an object is created using these features. Once the basic graphical nature of an object is done, painting features can be used to "fine-tune" the appearance. In a preferred embodiment, the basic mode for drawing is shape-based, which starts with a basic shape that the user stretches or scales appropriately to the desired size. Line attributes, drawing modes, shapes and text may also be selected in accordance with techniques known to those skilled in the art.

The graphics editor 404 may also include painting features for enhancing the basic drawing by providing texture and color to the graphical objects. For this purpose, a default color palette may be made available to change the pen, foreground, background and text colors. Various fill patterns as well as dithering and airbrush capabilities may also be provided. In addition, audible features such as beeping, clicking and the like may be provided for the graphics editor 404 so that the user has access to these features when defining the behavior functions.

VSE Objects

A graphical object is the key object for the VSE system 400 of the invention. It communicates with more of the VSE system 400 than any other object. Preferably, the VSE object consists of two major parts, the graphic element and the behavior element. These features of a graphical object will be described in more detail below.

As is typical of objects in object-oriented systems, a graphical object in accordance with the invention must be able to draw itself if asked to do so and to indicate that it has been selected. This may be done using little boxes that appear on the object. A whole composite object may be selected or it may be selected to show that all of its children are selected.

Preferably, a VSE object of the invention tracks a behavior function (graphics manipulation) such that when a value change occurs (a behavior event), the VSE object can change its graphical representation and update itself on the display. The user can either define end point value changes and the graphical object will interpolate with intermediate values or the user can select discrete value changes such that the object state for each discrete value of the behavior function is defined. The user can also specify that another behavior function be triggered when the value of the behavior function reaches a given range. As previously noted, the basic behaviors are change color, move, rotate, scale, stretch, fill, map, unmap, raise, lower and the like. All of such operations are preferable done relative to the current position of an object.

As will be described in more detail below, the graphical object can also be set up to track sequences of user input such as a mouse button depression followed by a mouse drag, followed by mouse button release. While receiving such user input, the graphical object registers with the behavior router 412 what events it wants next. When an event sequence has occurred, it can set the value of a behavior function and can also map events such as coordinate values and buttons to behavior function values.

After an object is created it is inserted into the universe 420. The universe 420 manages which object is on top of what object and also manages the list of views that gets updated when the universe 420 has been damaged. The universe 420 also receives input events from the views in input mode and routes those events to objects that have registered to receive those types of events. A VSE object includes display state names and values which are stored with the behavior information. Once an object has been inserted in the universe 420, as long as it is in the universe 420 it will be drawn in all of the views of the universe 420 when the object changes.

When behavior has been defined for a VSE object, it registers itself with the behavior router 412, telling what behavior functions it is interested in and their initial values. The VSE objects also can be manipulated by the graphics editor 404 as well as the palette editor 406. Also, as will be described in more detail below, the behavior editor 408 can define or delete a behavior function, define or delete a behavior state, specify that an operation be performed in relative or in absolute terms, and determine the behavior functions and states defined for an object.

Each VSE object preferably has a unique name at its level in the hierarchy. This name is usually defaulted by the VSE system 400 so that the user never has to refer to an object by its name. Thus, when a user wants to manipulate an object, the user refers in his or her code to the name of the behavior function that changes the object and not the object name.

Graphical objects can be stored in three different files, namely, the aforementioned design and graphical files and a palette file. The design file manages the user's current work area, while the palette file stores templates of objects that usually have behavior states associated with them. The graphical file, on the other hand, contains a current graphical representation of a graphical object (which can be printed). The graphical file also can be used to receive graphical objects from other graphical editors outside of the VSE system 400. An object is responsible for saving and restoring itself to the design and palette files only. For graphical file inputs, the file reader will read the file and create objects based upon the contents of the file. For output, on the other hand, it will draw the object to an offscreen graphic block and output raster data in the format required.

Palette Editor 406

Figure 5:
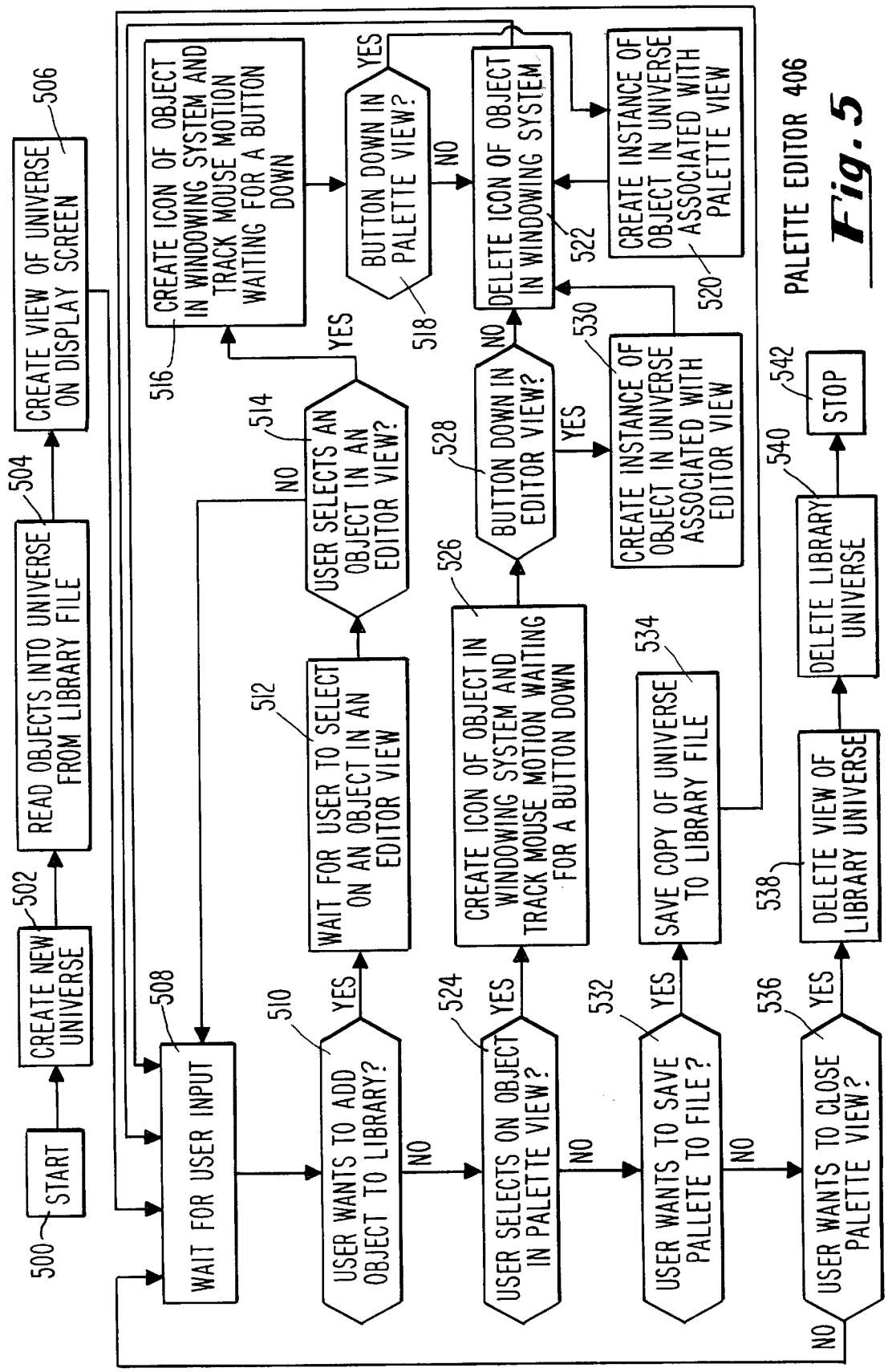
FIG. 5 illustrates a flow diagram of the operation of a palette editor 406 in accordance with a preferred embodiment of the invention.

The palette editor 406 of the invention is the part of the VSE system 400 that allows the user to create and manage libraries of VSE objects (referred to herein as "palettes"). The palette editor 406 lets the user view what palettes are on the system, create new palettes, delete old palettes and edit existing palettes. While editing palettes, a user can display what objects are in a palette, change the location and size of objects on the palette, and move objects back and forth between the work area and the palette. A flow diagram illustrating the operation of a palette editor 406 (steps 500–542) in accordance with a preferred embodiment of the invention is shown in FIG. 5.

In a preferred embodiment, the list of available palettes appears in a scrollable sub-window of the VSE system 400. Also, each design file preferably contains a list of palettes used during its creation. When a design file is loaded, its list of palettes is merged with a list already acquired from the appropriate resource file. A design file may contain a list of palettes that were open when it was last saved, and if so, these palettes will be opened automatically when the file is loaded.

Palettes appear by file name in the scrolled list, where the base name is listed first and a separate column lists the directory path to the file. Preferably, an edit field and buttons accompany the palette list so that selecting an entry in the palette list with the buttons places the palette's complete name in the edit field. The palette's name may also be placed in the edit field and a window displaying icons for the objects in the palette by pressing the buttons twice. The name also may be entered in the edit field from the keyboard as well.

A new palette may be created by the palette editor 406 by creating a unique name for the new palette and then defining a pathname segment. The name for the new palette is then added to the palette list, and if desired, a window may be opened. Data for each object stored in the palette file may include the object's name and the type of object (either a composite object which is a place holder for other sub-objects, or a primitive object which is an object which has a graphical representation). If the type of object is a primitive, then the primitive type should be identified. Definition for the behavior functions defined are also stored in the palette file. Also, default behavior function values for each object may also be stored in the palette file with the object. A user may bring up any number of such palettes during a VSE session. Of course, functions are also provided for allowing objects to be added, deleted and saved from the palette, and the palettes may be renamed and copied in accordance with techniques known to those skilled in the art.

Preferably, objects are represented on the palette by having the object draw itself on the palette's view. A name for the component accompanies it. A scrollable window also may be created to view the objects on the palette.

A pick and place method is preferably employed for selecting an object from a palette and creating a copy of it in a VSE view. An object can preferably be copied between palettes and from a view to a palette. When an object is added to a palette, it is given a default name by the VSE system 400 to display in the name field that accompanies the icon for the object. This name will be unique with respect to other names associated with the existing objects on the palette. In addition, the name field is preferably editable so that the user may select a more appropriate name.

Behavior Editor 408

Figure 6:
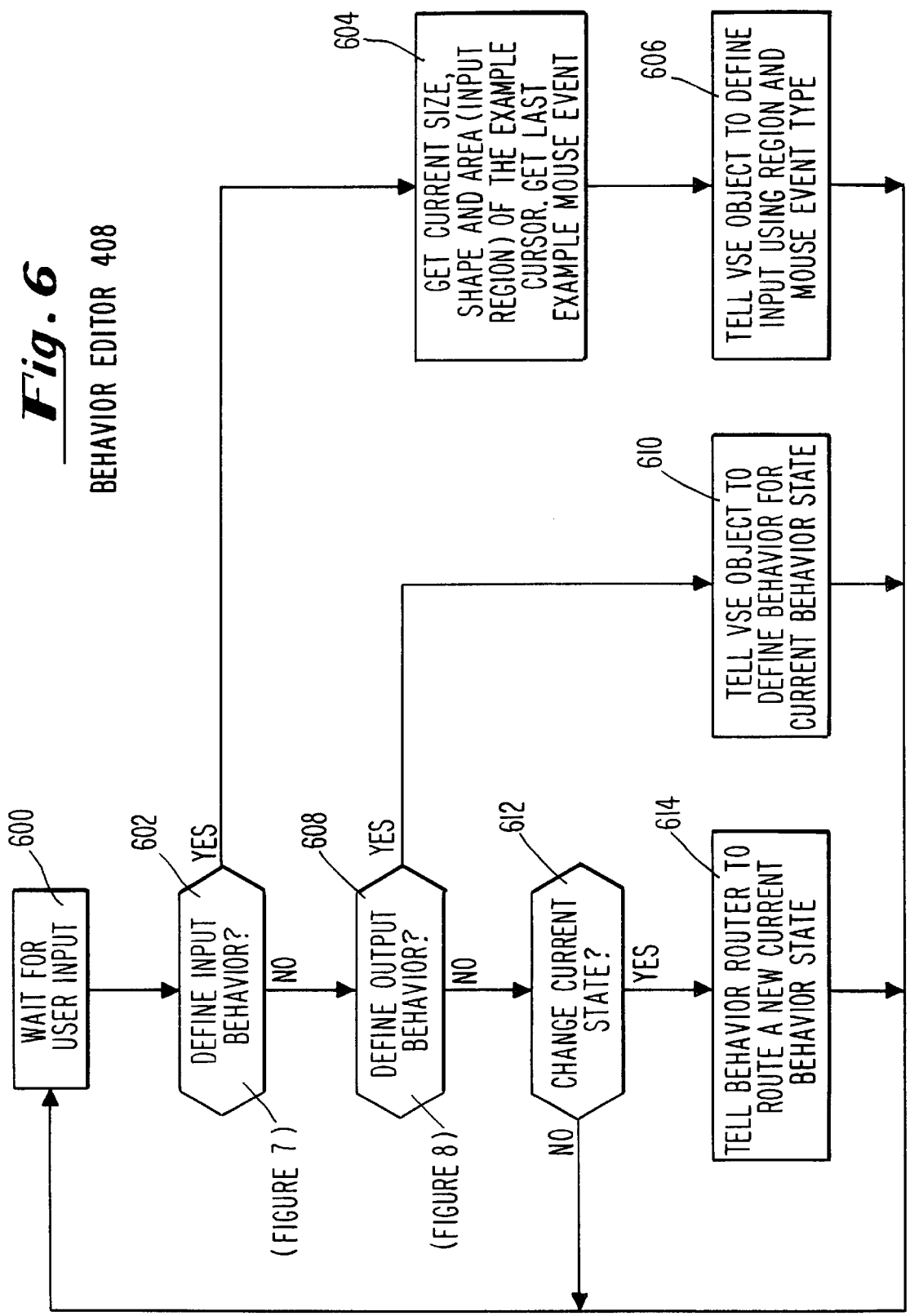
FIGS. 6–8 illustrate flow diagrams of the operation of a preferred embodiment of the behavior editor 408 of the invention.
Figure 7:
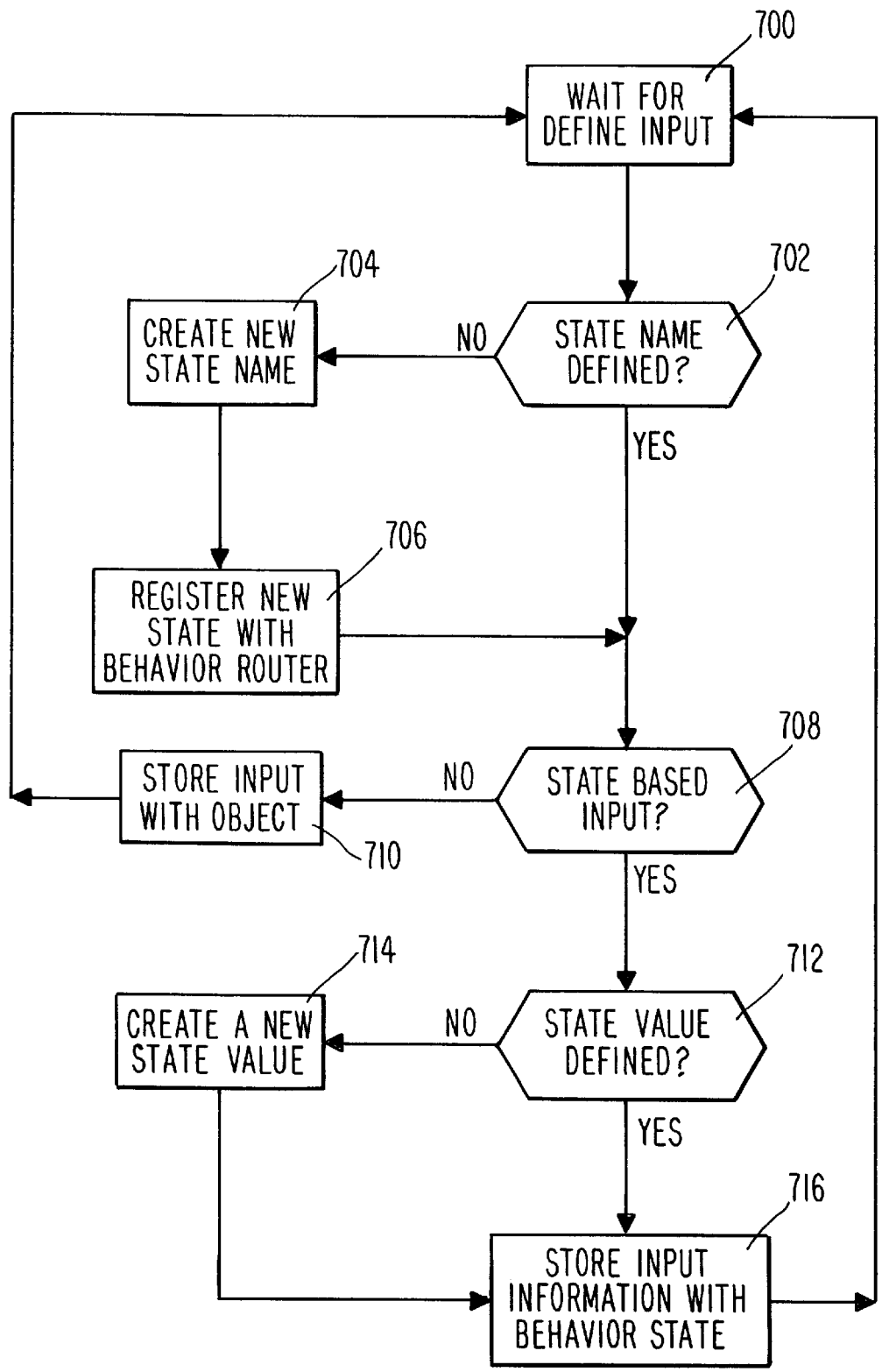
Figure 8:
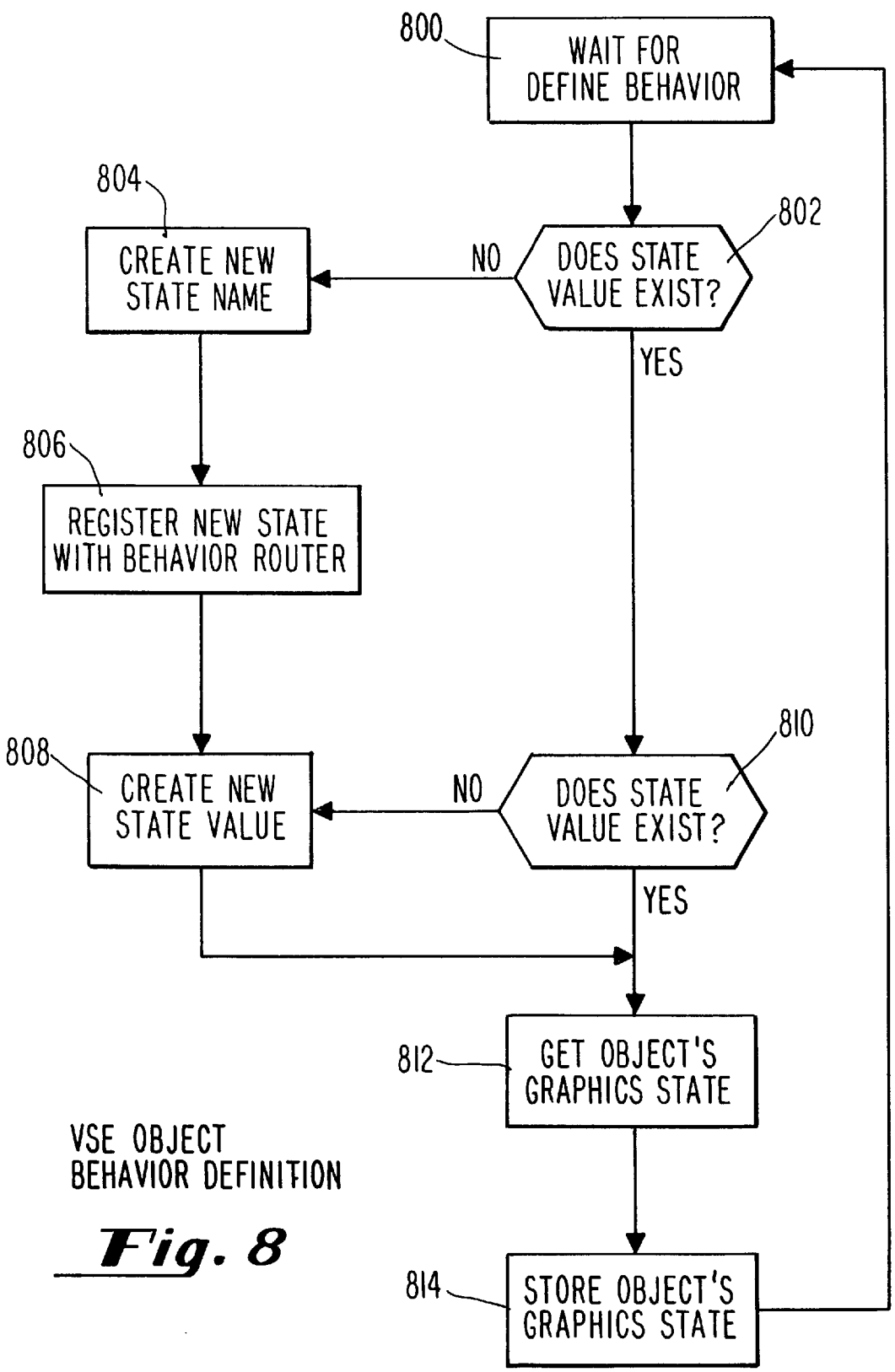

The behavior editor 408 is the part of the VSE system 400 that allows the user to define what input and output behavior states an object has. Flow diagrams of the operation of a preferred embodiment of the behavior editor 408 are illustrated in FIGS. 6–8. As noted above, the VSE system 400 uses a paradigm of defining behavior by example. Thus, when defining output behavior, the VSE system 400 uses the new graphics state which is created by the user after manipulation of the object. The user tells the VSE system 400 to remember that state so that it can later be played back in an animation sequence. The user tells the VSE system 400 to remember a state by using, for example, a mouse to press a button on the computer screen labelled "Define Output". As will be apparent to those skilled in the art, this concept is very similar to taking a series of frames with a movie camera.

Behavior editor 408 (FIG. 6) controls the definition of custom functions for VSE graphical objects by mapping the current graphics state of an object to a user defined output state name and value (steps 600–614). Importantly, the behavior editor 408 in accordance with the invention also maps a user defined input region, state name, and value to a user input operation such as a mouse operation defined with an example mouse, a mouse button click or a mouse movement, or a keyboard input (FIG. 7, steps 700–716). The behavior editor 408 also allows the user to view what behavior an object has defined for it and delete, move or copy that behavior if desired (FIG. 8, steps 800–814). The behavior editor 408 also allows the user to send behavior events to objects by specifying the behavior state name and a value.

The behavior editor 408 defines custom "functions" for a graphical object by allowing the functions to take a single parameter within a range of values defined by the user for that parameter (e.g., integer values from 0 through 100). The user also graphically manipulates the object using the graphics editor 404 to define how the object should change its appearance for the range of values. In this manner, the user basically maps a set of graphical states for the object for an integer range of values.

The VSE system 400 preferably provides means for linearly interpolating the manipulations like move, scale, rotate, fill and stretch so that it is only necessary to define the appearance for an initial value and a final value, where the initial and final values are not consecutive. If the initial value and final values are consecutive (e.g., 0 and 1), then the object is transformed completely during one state transition. In this manner, discrete behaviors may be created.

The behavior editor 408 is displayed by requesting it for the currently selected object. The view of the behavior editor 408 changes so that it always displays information for the currently selected object. The behavior editor 408 lists in the behavior editor window the currently defined functions for the selected object and its sub-objects, if any exist. The user can display details for a particular function by selecting it from the list. Details for multiple functions then come up in a separate window. A cut and paste mechanism may be provided to allow the user to cut and paste details between windows as desired.

Preferably, the details for a function of the behavior editor 408 includes the function name, the minimum and maximum numbers that establish the range of values currently defined for the function's input parameter, the selected value within the minimum to maximum range that should be passed to the function when the object is initially instantiated, and an action list that textually describes the graphical operations that are performed by the function and for what ranges of input values the operations are performed. For example, buttons in the behavior edit window allow the user to directly call the currently selected function with a parameter value within the minimum to maximum range. This allows the user to immediately observe the object's behavior under the control of the given function. The user can invoke one or more calls of the function with new parameter values. Actions for a function can be added or modified at any time by placing the object in a desired state, directly manipulating the object to modify its appearance for that state, and then saving the modifications. Upon saving the modifications, the action list is automatically updated to reflect the changes. Actions for a function can also be modified by directly editing the entries in the action list, adding new entries, or deleting current entries.

By default, the VSE system 400 will capture behavior actions in relative terms and execute them with respect to any outstanding transformations. For instance, if the behavior defined for some object is to rotate 90° clockwise from its initial state for the input value range 0–90, after exiting the behavior editor 408, the user may decide to roll the object over on its right side by rotating it 90° clockwise. If the behavior function is now executed, it will rotate the object 0°–90° clockwise relative to its new orientation. As a result, the action descriptions must be able to map at least input values, delta values and constants; however, absolute positioning may also be used by those skilled in the art. Once defined, the user can call the behavior function from the user's application program. Calling a behavior function results in the creation of a behavior event, but calling a behavior function with a state value that does not currently exist causes no action to be taken by the VSE system 400.

In a preferred embodiment of the invention, more than one object can have a behavior function with the same name. When such a function is called, all of the functions with that name are invoked. That is, the behavior event is fanned out to all interested objects, thus giving the user a simple mechanism for connecting VSE objects together. However, if a behavior function is shared by multiple objects, the initial value assigned for the function must also be shared.

If the initial value is modified in the behavior editor 408 for one object, it is actually modified for all objects. Also, if a new object is duplicated on the work area from the palette of palette editor 406 or another object on the work area, its behavior functions assume the current values and initial values from any matching behavior functions for objects already in the work area. Thus, the present invention may be modified to include a global behavior function rename mechanism for an object.

Objects may be supplied on the default palettes that have intrinsic behavior functions already defined for them. That is, the actions by these behavior functions cannot be described from within an action list. An example is a strip chart object that has behavior functions to allow the user to add arbitrary points to the chart or clear the chart. This cannot be described by direct manipulation nor can it be presented as a sequence of actions. These "intrinsic" behavior functions may be treated as calls to object translation or edit functions where the behavior function input value is mapped one-to-one with the input value through the translation or edit function. As part of the behavior editor 408, the user can request to see a list of the translation or edit functions supported by the object.

An input object (i.e., an object whose appearance changes in response to a keyboard or mouse event) is preferably just a superset of an output object. The input object's necessary changes in appearance are mapped to states of a behavior function so that it is only necessary to map keyboard or mouse events to the range of values accepted by the behavior function. In practice, the user may desire some sequence of mouse or keyboard events to trigger the execution of a behavior function.

Command Router 410

The command router 410 is the part of the VSE system 400 that routes commands to the various parts within the VSE system 400. All commands are routed through the command router 410, and any part of the VSE system 400 that wants to know when a particular command is executed can register with the command router 410 and then receive a message when the command gets executed. For example, the behavior editor 408 will register for the select command, and when the user does an object select, the graphics editor 404 will pass the select command to the command router 410, which will notify the behavior editor 408 that a select occurred. The specific design of an acceptable command router 410 is left to the discretion of those skilled in the art.

Behavior Router 412

The behavior router 412 is the part of the VSE system 400 that routes behavior events to the objects within the VSE system 400. As noted above, a behavior event is the setting of a given behavior state to a state value. User code, VSE objects, and the behavior editor 408 send out behavior events to the behavior router 412. The behavior router 412 then sends the events to any objects or other VSE components registered for that particular behavior state name.

Figure 9A:
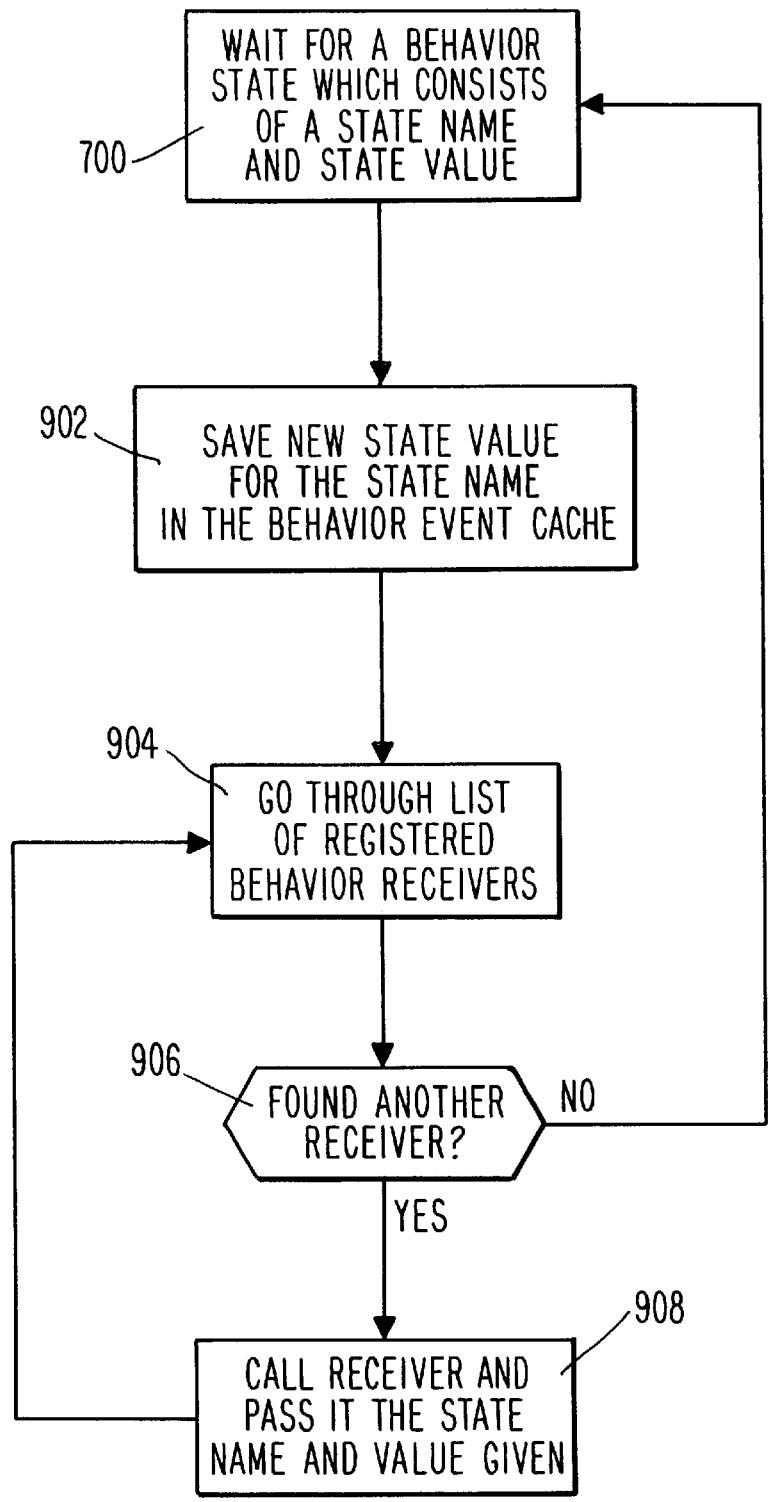
FIGS. 9(a) and 9(b) together illustrate a flow chart of the operation of a preferred embodiment of the behavior router 412, where
Figure 9B:
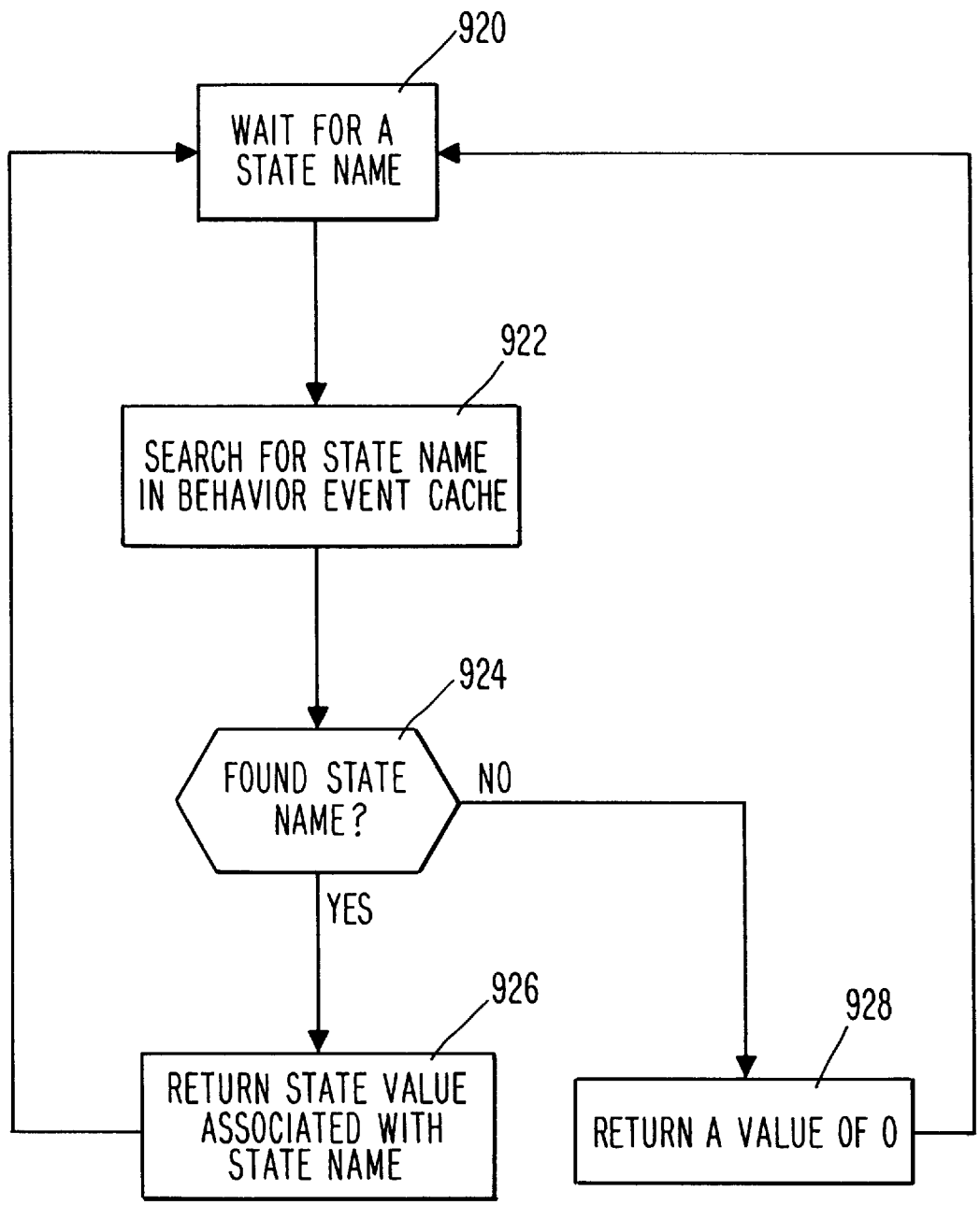
Figure 10:
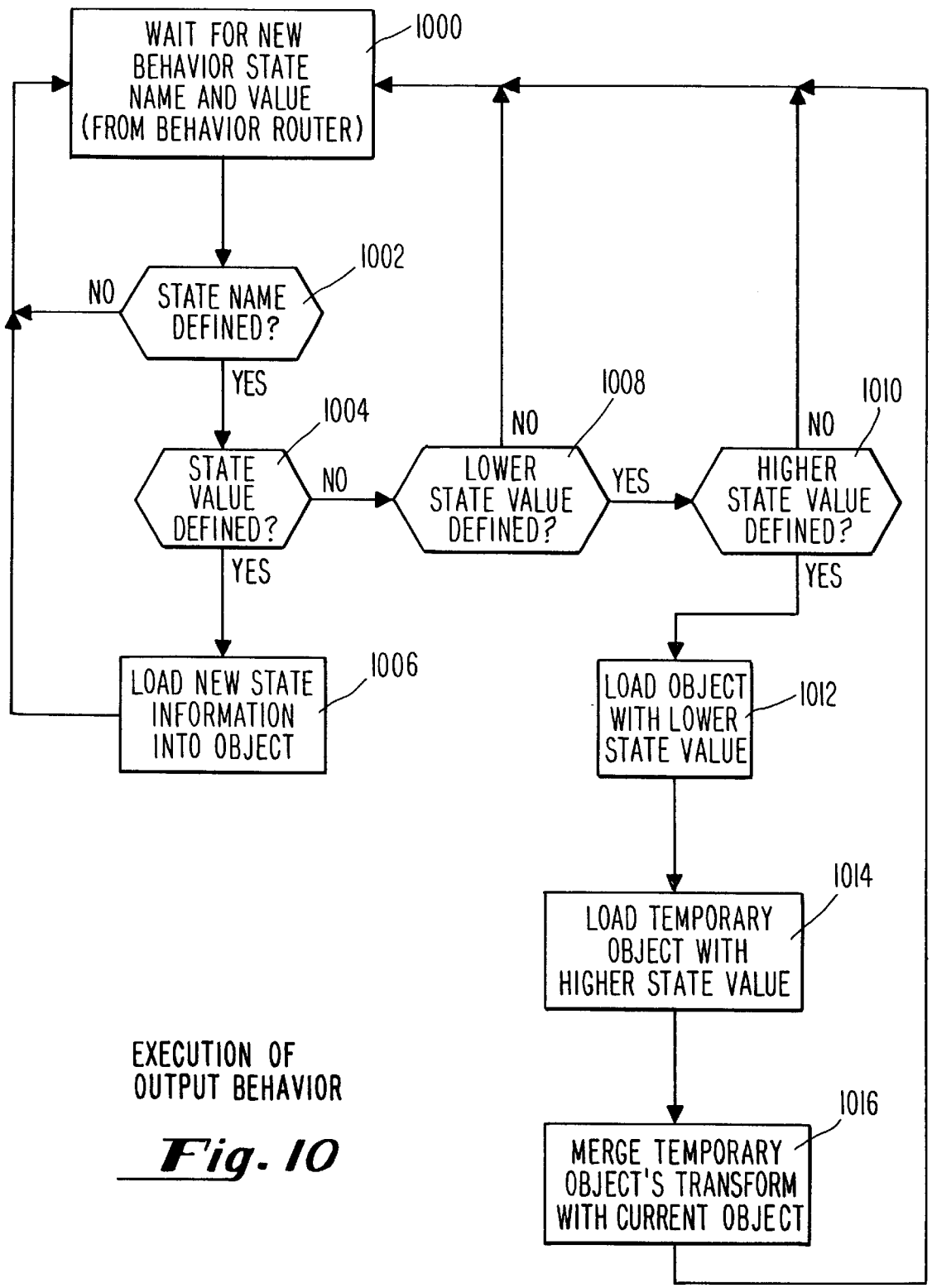
FIG. 10 illustrates a flow chart of the execution of a VSE object's output behavior function.
Figure 11:
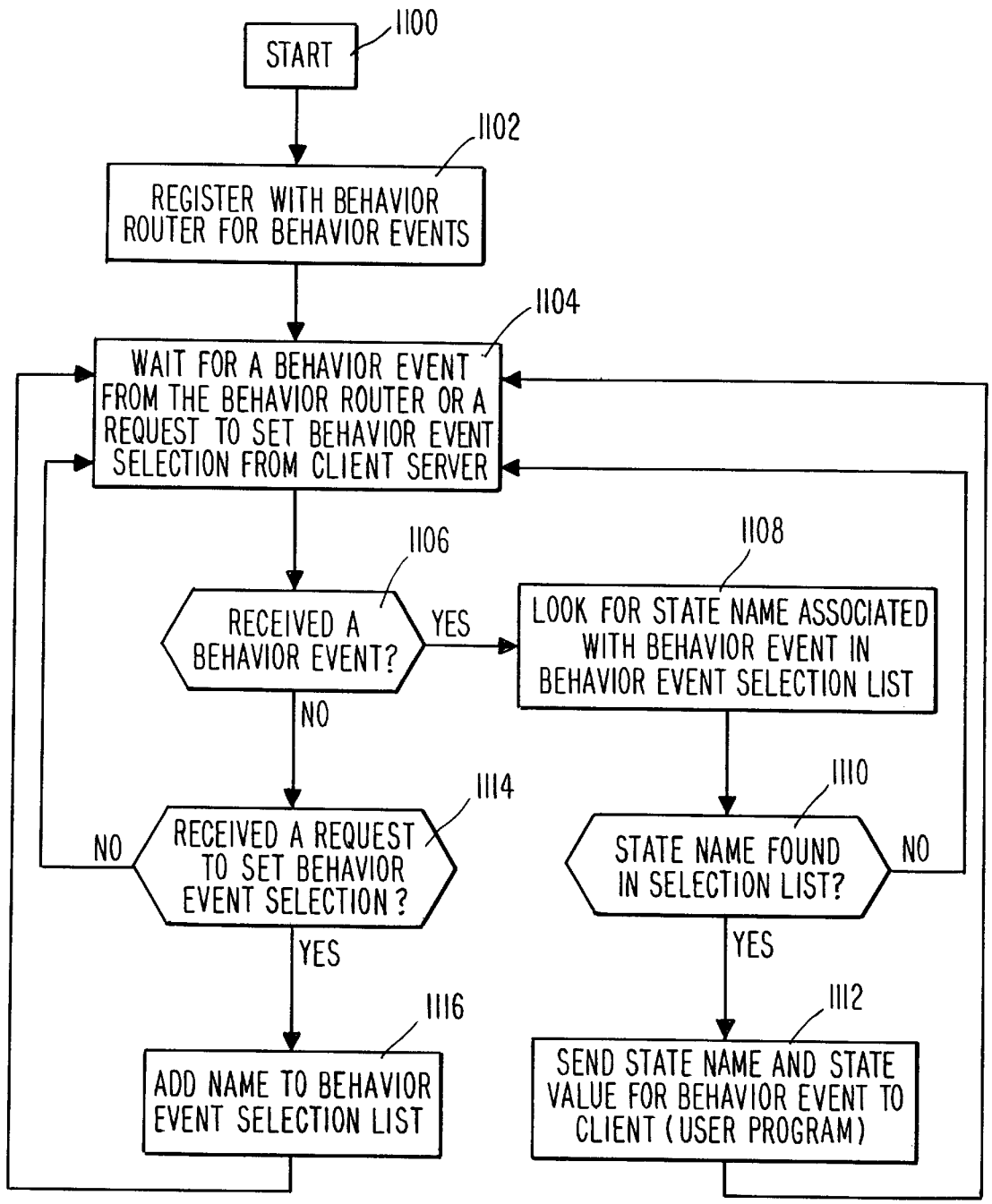
FIG. 11 illustrates a flow chart of a preferred embodiment of a client agent for managing a new connection to a user application.

A flow chart illustrating the operation of a preferred embodiment of the behavior router is given in FIGS. 9(a) and 9(b), where FIG. 9(a) illustrates a flow chart having steps 900–908 for passing behavior state names and values to registered objects and FIG. 9(b) illustrates a flow chart having steps 910–918 for searching for registered behavior states.

As noted above, the behavior router 412 receives behavior events which consist of an event name and an integer value. On receipt of a behavior event, the behavior router 412 determines which graphical objects have a behavior function of the same name. The behavior router 412 sequentially contacts each object and requests the object to execute its version of the behavior function with the desired value in accordance with the flow chart having steps 1000–1016 illustrated in FIG. 10. If appropriate, the behavior router 412 may also notify the client applications about the behavior event. More than one graphical object can have a behavior function by the same name. Each object, however, has its own definition for the action or actions performed by the behavior function. Thus, multiple objects cannot share a single definition for a behavior function. However, they may have identical definitions as a result of being copies from the same palette object. As will be apparent to those skilled in the art, it is typically a client application that initiates a behavior event to cause a graphical object to change state.

A graphical object generates a behavior event under a variety of circumstances. For an object that accepts input from the user, a mouse or keyboard event may cause the object to execute one of its behavior functions. The object sends a behavior event to the behavior router 412 after the object executes its associated behavior function. If there are other objects with the same behavior function, the behavior router 412 makes calls to them. It will also route the event to any client applications. On the other hand, one or more of the actions of a behavior function can be a requested to generate a behavior event for another function. If the object executing the initial behavior function also has a function associated with the new behavior event, it will execute it before sending the new behavior event to the behavior router 412. If there are other objects with the same behavior function, the behavior router 412 will make calls to them. It will also route the behavior event to any client applications.

The object or client application that initially generates behavior events is not contacted by the behavior router 412 when it handles the event. For example, assume that object A, object B and object C are graphical objects where each has a behavior function F(integer value) associated with it, and assume that client A and client B are client applications connected to the VSE system 400. Then, if client A initiates a behavior event for F(10), upon receipt, the behavior router 412 will ask objects A, B and C to execute their respective F(integer value) behavior functions with a value equal to 10. The behavior router 412 will also pass on the behavior event for F(10) to client B. On the other hand, if it is assumed that object A receives a keyboard or mouse event that causes it to execute its behavior function F(integer value) with value equal to 20, after execution is complete, object A will initiate a behavior event for F(20). The behavior router 412 will ask objects B and C to execute their respective F(integer value) behavior functions with a value equal to 20. Behavior router 412 will also pass on the behavior event for F(20) to client A and client B.

A behavior function for an object is defined using the behavior editor 408 as previously described. The behavior editor 408 allows the user to select the graphical changes an object goes through as the behavior function is called with different values or ranges of values. As part of the definition, the user can select a default value that the user wants the behavior function to be called with when it is initialized. When an object in universe 420 is saved to a design file or a palette, definitions for its associated behavior functions are saved as well. In addition, the default and last values for each behavior function are saved.

A behavior function for an object is activated when the object is loaded from a design file, or when the object is copied from a palette. The object itself registers for behavior events relating to the behavior function just created. The behavior router 412 accepts these registration requests.

In a preferred embodiment, a call to register with the behavior router 412 for a behavior event requires the parameters object identifier, behavior event name, desired default value and last known value. The object identifier identifies who to call when the behavior event is detected, while the behavior event name is the name of the event being registered for. The desired default value determines what value the caller thinks the behavior function should be passed on initialization, and the last known value gives the last value of the behavior function before it was saved to a design file. If the behavior editor 408 is doing the instantiation, it passes the desired default value supplied by the user during behavior function definition. It has no concept of a last known value and thus passes the desired default value as the last known value. However, if the instantiation is occurring as a result of a design file load, the desired default value and last known value are supplied from the design file information. If the instantiation is occurring as a result of copying an object from a palette, the desired default value is supplied from the palette file information. Since palette objects should preferably appear in their default states, the desired default value should be passed as the last known value. The behavior router 412 needs the default and last values to determine what value the behavior function should actually be initialized with. It returns this value to the caller, who sees to it that the behavior function is executed with this value as a parameter. However, a behavior event preferably is not generated when the behavior function is called as part of the initialization process. In other words, client applications will not receive a behavior event as a result of behavior function initializations.

Part of the job of the behavior router 412 is to ensure that all behavior functions associated with a particular behavior event maintain identical states. That is, each function needs to be called with an identical value when a behavior event occurs. If a new behavior function is instantiated, it must be initialized with the most up-to-date event value. However, when the behavior router 412 receives a registration request, it preferably uses the caller's desired default value and last known value as well as its own history for the particular event to determine the value that should be used to initialize the new behavior function. Thus, one of the two following scenarios occurs during registration:

Scenario 1

If this is the first time anyone has registered for the given behavior event and no one has ever generated the event, the behavior router 412 creates a new entry in its list of behavior event current and default values. The desired default value received from the registrant is stored by the behavior router 412 in the default value field for this behavior event. If the VSE system 400 is in the mode of loading all objects in their default states, the behavior router 412 ignores the last known value, stores the desired default value as the current value, and returns the desired default value as the recommended initialization value. On the other hand, if the VSE system is in the mode of loading all objects in their last known state, the behavior router 412 stores the last known value as the current value and also returns it as the recommended initialization value.

Scenario 2

If another object has already registered for the given behavior event or an event has been generated prior to this registration, the behavior router 412 already knows the current value for the event and it may know the default value as well. If the behavior router 412 does not have a default value stored (i.e., the behavior router 412 has received behavior events but this is the first object to register for those events), its stores the default value passed by the registrant. Otherwise, it ignores it. Also, since the behavior router 412 already has a value stored as a result of a prior registration or receipt of a behavior event, it ignores the last known value passed by the registrant and returns its stored current value as the recommended initialization value.

The behavior router 412 preferably provides methods to allow other parts of the VSE system 400 to query it for the current and default values associated with a behavior event. The palette editor 406 will want to use these methods when an object is copied from the universe 420 to a palette and it needs to record the default values associated with each behavior function. The behavior editor 408 will also want to use these methods when it creates its view into a currently defined behavior function and it needs to display the associated default value and current value. The behavior router 412 will also provide a method to allow other parts of the VSE system 400 to modify the default value associated with a behavior event. The behavior editor 408 may want to use this to allow the user to modify the default value associated with the currently defined behavior function, but as noted above, this may actually cause the default value to change for all behavior functions of the same name.

The behavior editor 408 will also want to register for behavior events with the behavior router 412. For example, if it is assumed that the behavior editor 408 is currently viewing a behavior function F(integer value) for graphical object A, if a client application generates a behavior event for F(20), the behavior editor 408 will want to be notified so that it can update its view. For example, it would want to change the display field showing the current value for the function.

On the other hand, client applications do not need to explicitly register to receive behavior events. When the VSE system 400 detects that a client is connecting, it will instantiate a client agent for managing the new connection as illustrated in steps 110–1112 of FIG. 11. The client agent will make a special registration request with the behavior router 412 requesting notification for all types of behavior events including any new types that might come along in the future. Then, behavior events sent to a particular client application may actually be placed on a queue by the client agent. A VSE client-side library may be used to request items from the queue. The VSE client-side library is a mechanism which initiates transactions on the VSE transport medium such as connecting, reading its queue, generating a behavior event and reading a current value.

When connecting, the VSE client-side library informs the VSE system 400 that it is connecting. It must do this before it can initiate any other type of transaction. This transaction instantiates a client agent to control the connection, and the client agent sets up a queue for future behavior events. The VSE client-side library then reads the behavior events currently in the queue by making the appropriate request. The VSE client-side library also requests the client agent to generate a behavior event, which is sent on to the behavior router 412 for dispatching to graphical objects, other clients, and possibly the behavior editor 408 if it is registered for events. The VSE client-side library also asks for the current value associated with a behavior event. Such a request circumvents all behavior events of the same name that might be queued for the client application. The behavior router 412 is then queried for the current value associated with a given event name and returns this to the client application.

Finally, the behavior router 412 preferably also provides a method to allow an object to deregister for a behavior event. For example, a graphical object may be deregistered if it is deleted from the universe 420. In addition, the behavior editor 408 is deregistered when the user closes it or requests to view a different behavior function. The client agent also must deregister when the client connection closes.

Client Server 414

Figure 12:
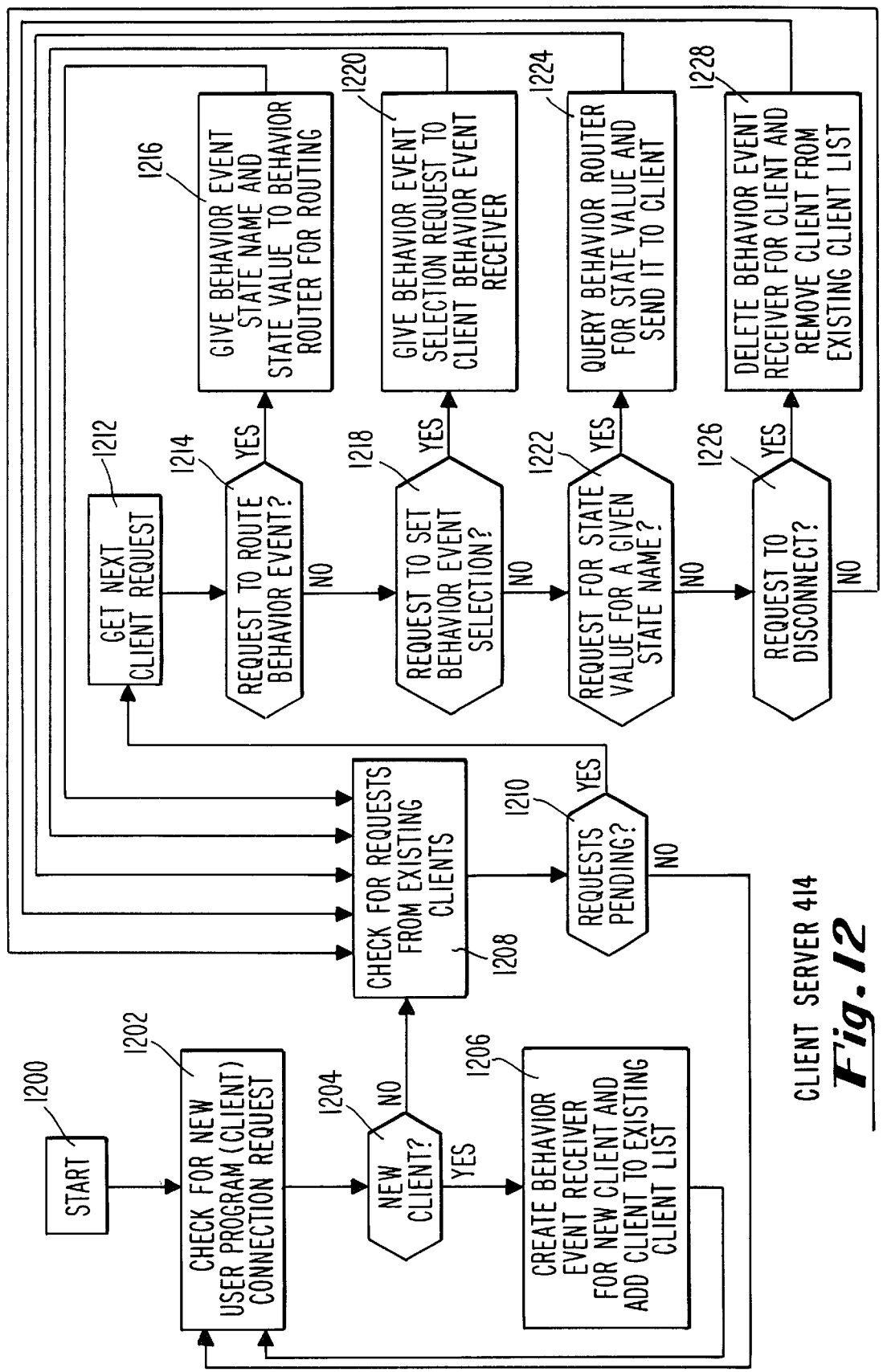
FIG. 12 illustrates a flow chart of a preferred embodiment of a client server 414 in accordance with the invention.

The client server 414 is the part of the VSE system 400 that connects user code to the VSE system 400. A flow chart having steps 1200–1228 of a preferred embodiment of a client server 414 in accordance with the invention is illustrated in FIG. 12. As shown, client server 414 establishes the connection between a user program and the VSE system 400 and passes information between the two as required.

Command Player/Recorder 416

The command recorder/player 416 is the part of the VSE system 400 that allows the user to record and playback actions that are performed. The user can record the actions to a file and play them back at any later time. When commands are played back, the VSE system 400 performs just as if the user was entering commands directly.

Behavior Recorder/Player 418

Figure 13:
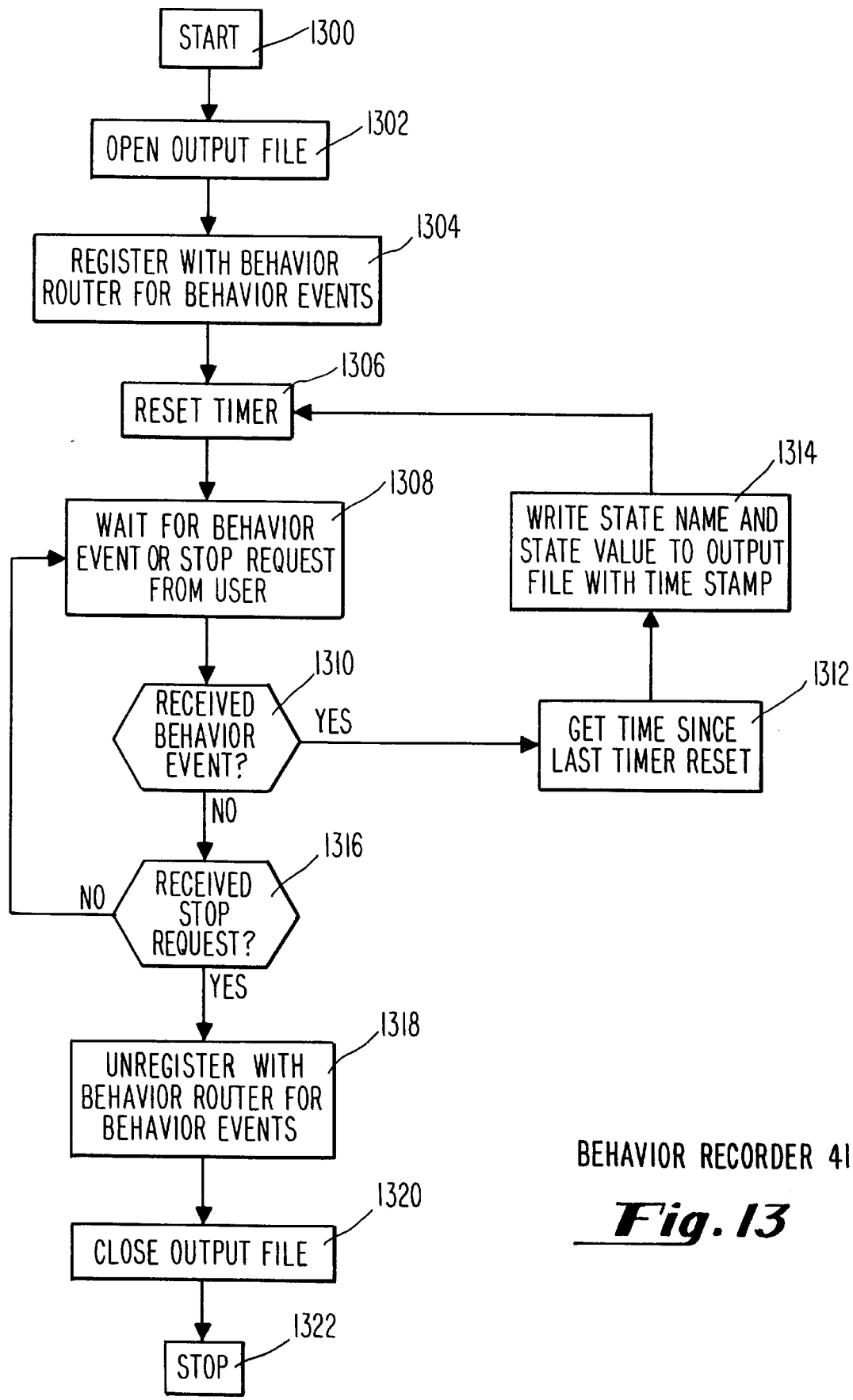
FIGS. 13 and 14 respectively illustrate flow charts of preferred embodiments of a behavior recorder and a behavior player in accordance with the invention.
Figure 14:
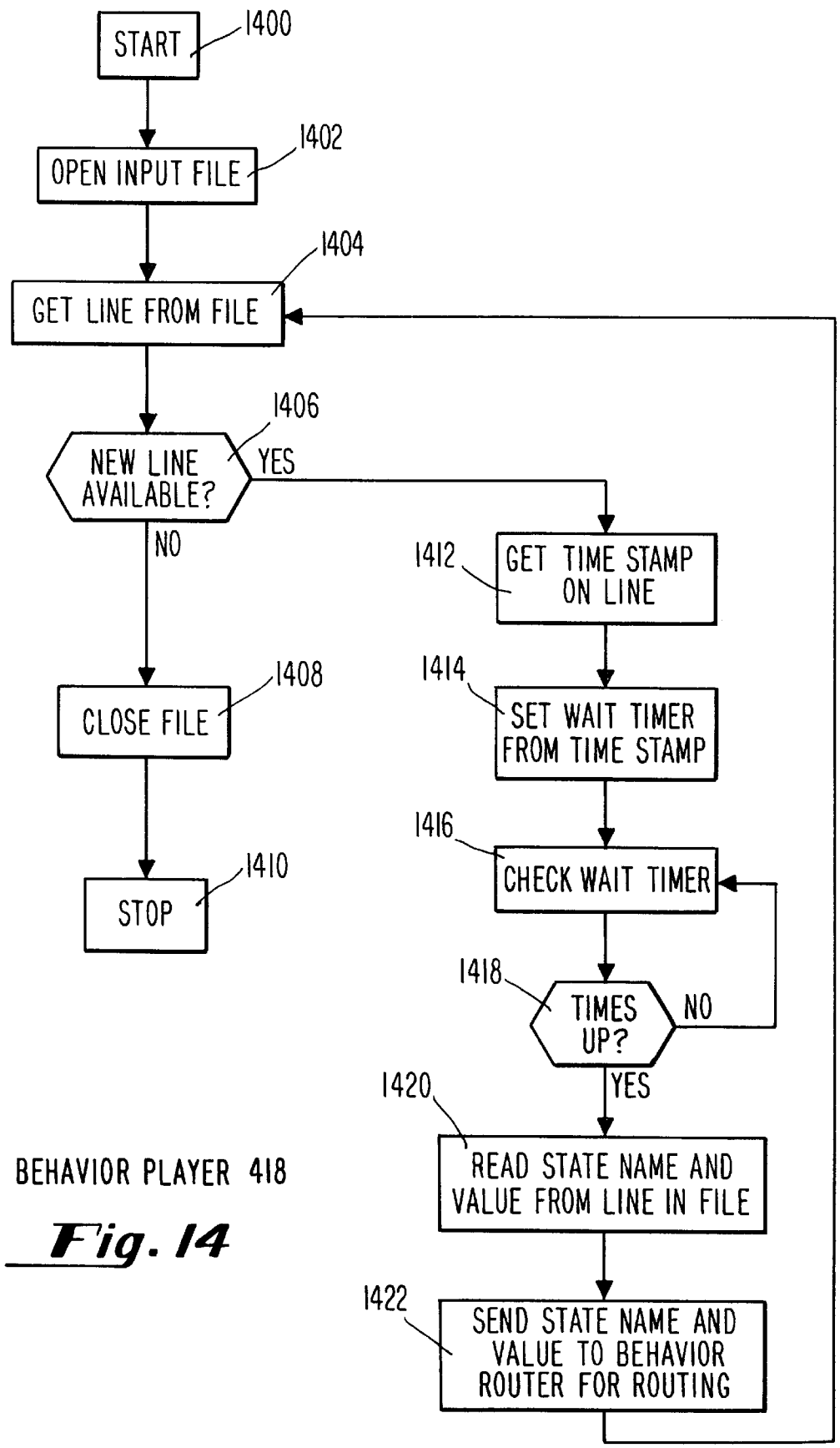
Figure 15:
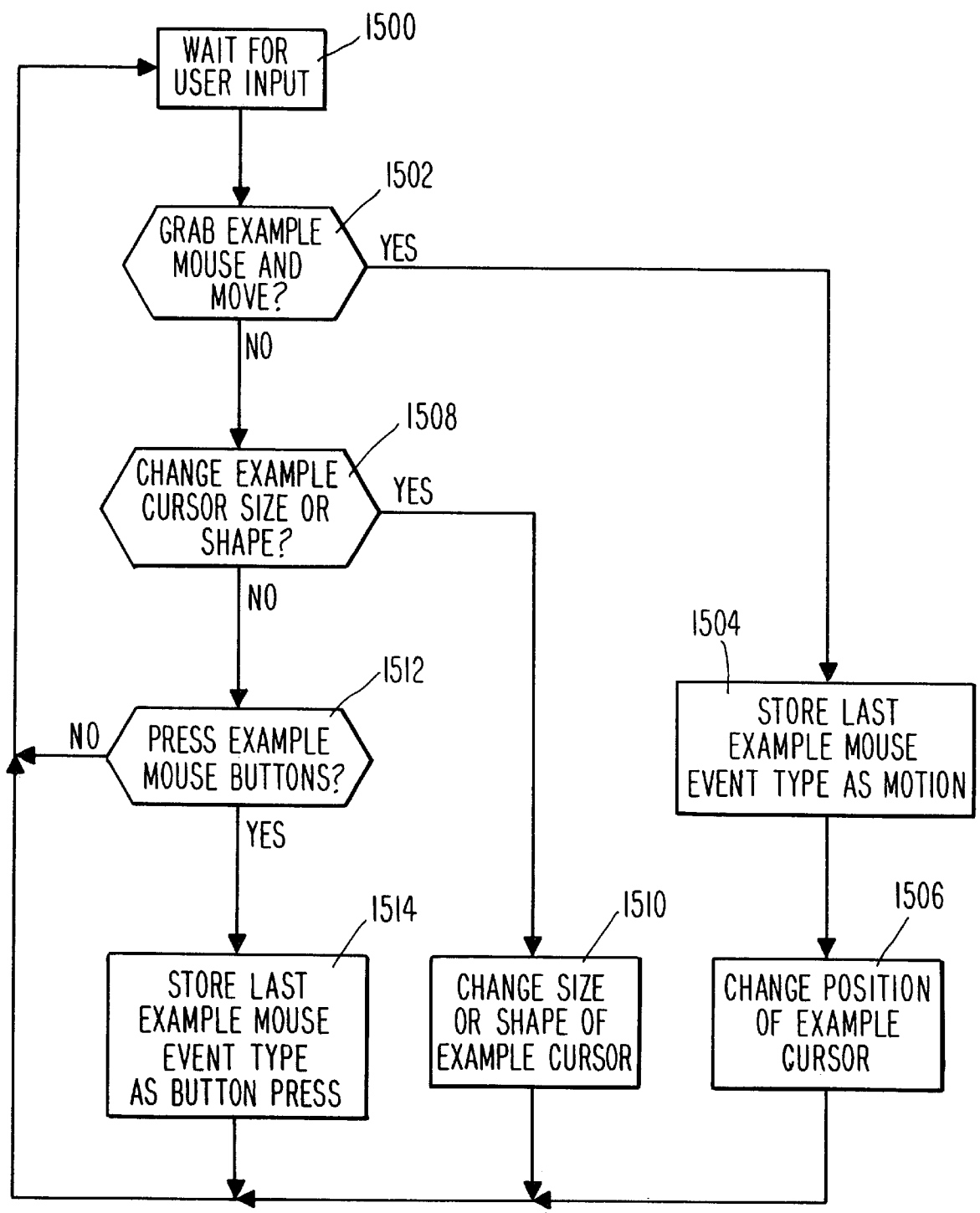
FIG. 15 illustrates a flow chart of the operation of an Example Mouse in accordance with the invention.

Similarly, the behavior recorder/player 418 is the part of the VSE system 400 that allows the user to record and playback behavior events. Since behavior events can come from the user or from the user's code, the user can choose to save these events separately or together with the commands. Just like commands, behavior events are recorded to a file and played back at a later time. FIGS. 13 and 14 respectively illustrate flow charts of preferred embodiments of a behavior recorder (steps 1300–1322) and a behavior player (steps 1400–1422) in accordance with the invention.

Universe 420

As noted above, the universe 420 is the part of the VSE system 400 where all the VSE objects are kept. The universe 420 is also responsible for updating all the views of an object when the object is changed. The universe 420 also allows objects to be saved and restored from disk files and views of the universe 420 to be added and deleted. The universe 420 also tells all the views when an object's appearance has changed so that they can redraw the parts that need to be updated. The objects within the universe 420 are illustrated by way of example in FIG. 4(*b*). As shown, the universe 420 may include VSE composite objects 422, VSE primitive objects 424, view objects 426, VSE behavior objects 428, viewport behavior objects 430 and panner objects 432.

VSE Composite Object 422

A VSE composite object 422 is the part of the VSE system 400 which makes it possible for objects to be built up in a hierarchial fashion. The VSE composite object 422 manages the objects that are attached to it, and operations performed on a composite object 422 are passed down to children objects via the VSE composite object 422.

VSE Primitive Object 424

A VSE primitive object 424 is the part of the VSE system 400 that represents an object that the user has drawn on the screen. It keeps the graphical state of the object as well as all the operations that can be performed on it. Graphical state information includes, for example, current graphical transformation, type of object, colors, line styles, and the like.

View Object 426

A view object 426 shows the user a view into the universe 420 of VSE objects. It is basically a window into a part of the universe 420 that shows all the objects in that area of the universe 420.

VSE Behavior Object 428

The VSE behavior object 428 is where the behavior for each behavior state of an object is saved. It contains information on what the graphical state of an object should be for a given behavioral state as well as the transformation to apply to the object to get the object into that state.

Viewport Behavior Object 430

The viewport behavior object 430 represents the behavior that a view object 426 can have. It is a different object than the behavior object since a view's behavior states do not include things like graphical state, but instead include information like if the view is active, what area of the universe 420 it is viewing, and the scale of the view.

Panner Object 432

A panner object 432 is the object that the user interacts with to change the viewing position of the views into the universe 420 and the scale the view is operating at.

Example Mouse

As described above, when defining output behavior, the VSE system 400 uses the paradigm of defining input by example. For example, the user might use a mouse to place the cursor over an object and press a button on the mouse. This would serve as an example to define a certain mouse sequence and position. However, the problem with such an approach is that in addition to using the mouse as an example, the user must also use the mouse to press the button labelled "Define Input". For this reason, two mice are needed. Namely, one mouse is used as an example (Example Mouse) for what input an object can accept, while the other mouse is used to operate the behavior editor 408 (Operation Mouse).

Figure 17:
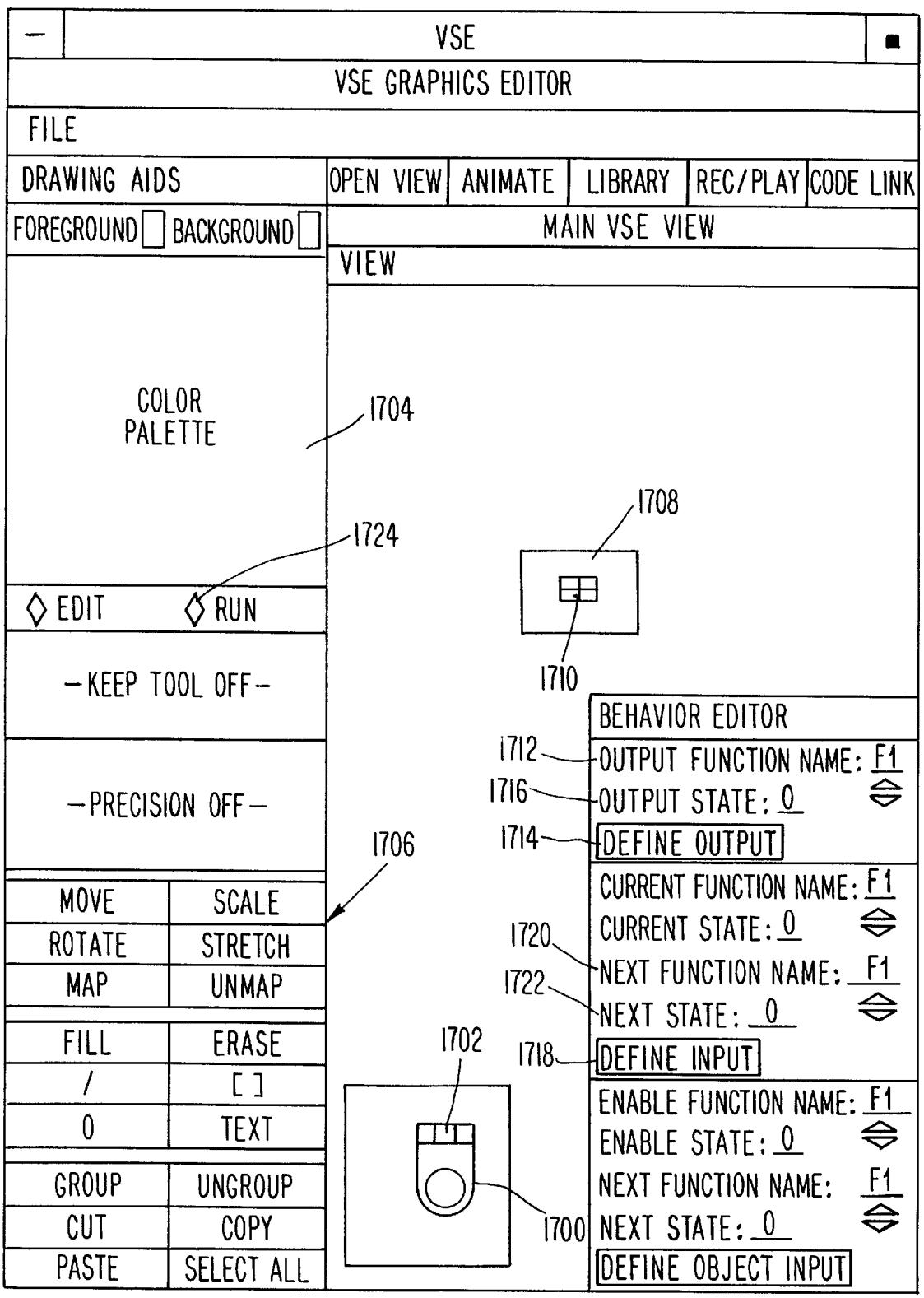
FIG. 17 illustrates a VSE graphics editor window with a sample push button and software mouse illustrated therein as well as a behavior editor window which allows the user to see the behavior state information for each frame of the animation.

Many different embodiments of an example mouse are possible. One embodiment could simply be a second physical mouse that is connected to the computer. However, additional computer hardware would be required to support such a configuration. The preferred embodiment of the example mouse is thus a graphics image of a mouse on the display screen. Such an example mouse is illustrated in FIG. 17 as element 1700. This example mouse 1700 can be moved around on the screen using the operation mouse, and the mouse buttons 1702 on the example mouse can be pressed using the operation mouse as illustrated in steps 1500–1514 the flow chart of FIG. 15. These events are recorded and stored with the object when the "Define Input" button is pressed.

Preferably associated with the example mouse is a cursor (Example Cursor). This cursor tracks the example mouse, and in addition to showing the position, the example cursor displays a shape or region (input region) that will be remembered by the object. A combination of the input region and the mouse events are combined to determine input behavior. The input region can take on any arbitrary shape; however, the input region is preferably either rectangular or polar in shape. A polar shape can take the form of a circle, a pie slice or a ring, which is useful when defining items such as knobs.

Figure 16:
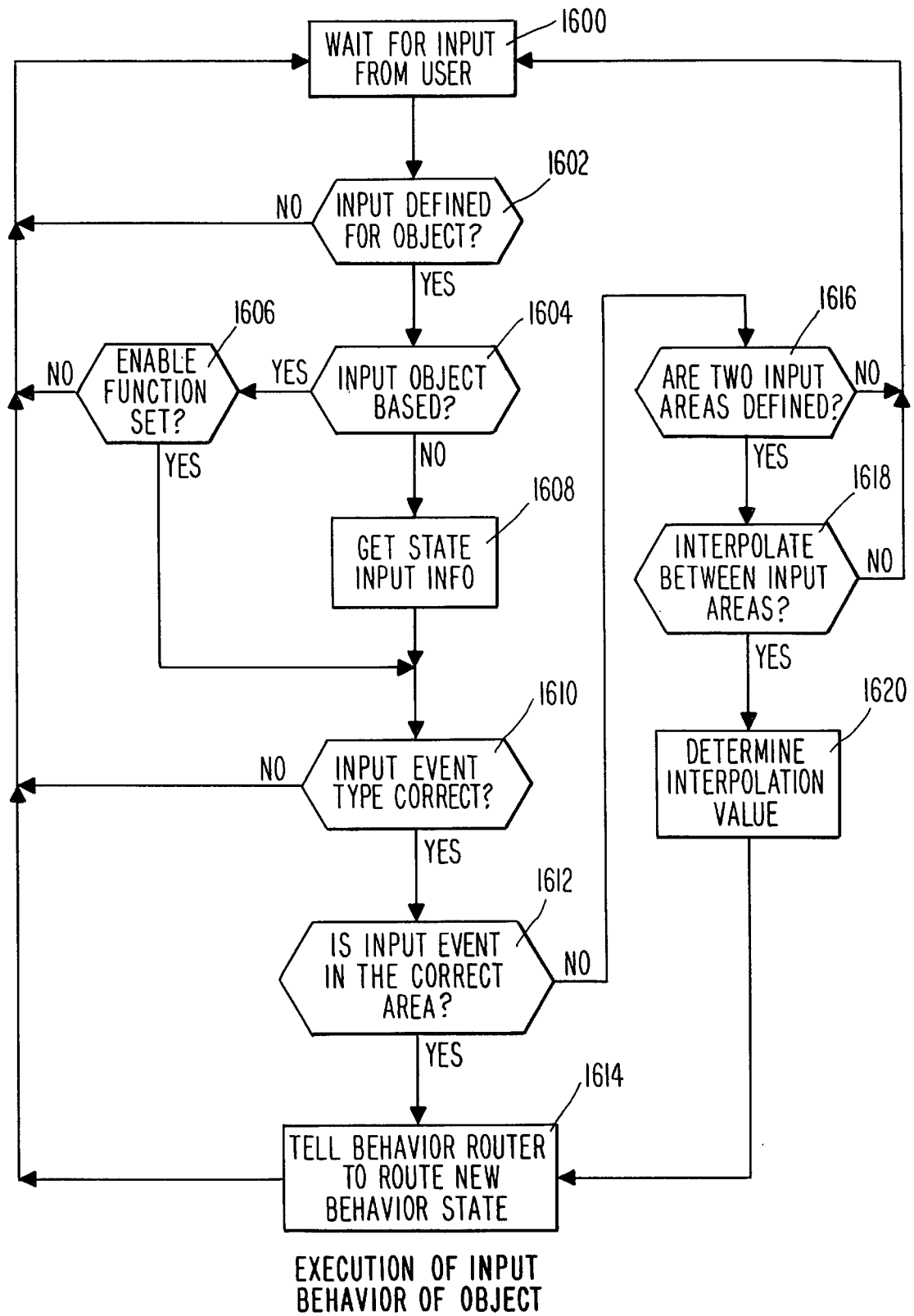
FIG. 16 illustrates a flow chart of the execution of the VSE object's input behavior in accordance with the invention.

Once the VSE object's input behavior has been so defined, the VSE object's input behavior may be executed by, for example, the user moving the hardware mouse. FIG. 16 illustrates a flow chart having steps 1600–1620 for executing the VSE object's input behavior in accordance with the invention. As shown, the input values may be interpolated between the values of stored behavior states so that the displayed object moves with smooth motion.

A Button Example

FIG. 17 illustrates a window into the VSE system 400 in accordance with a preferred embodiment of the invention. As shown, the VSE graphics editor 404 includes a color palette 1704 and graphics manipulation buttons 1706. The following example will explain the steps required to create a pushbutton 1708 using the VSE graphics editor 404 that changes color when the button is pushed (i.e., the mouse pointer is moved to the pushbutton area and a button on the mouse is pushed in and held). Each of the following steps first states what actions the user performs and then states what actions inside of the VSE system 400 are triggered by those user actions.

Step 1: Select the "[ ]" button of the graphics manipulation buttons 1706 with the Operation Mouse. This selects the box making tool. Then, move the Operation Mouse into the work area and hold down the Operation Mouse button while dragging the Operation Mouse. This creates a rubberband box that follows movement of the Operation Mouse. When the rubberband box is the size of the desired button box, the button of the Operation Mouse is released and a box is created which is filled in with the current background color (e.g., gray).

This causes the Graphics Editor 404 to create a rectangle (box) object and insert it into the universe 420. The rectangle object is passed its current color (gray) and creates a graphics transformation matrix that defines its location, rotation, and scale factors. The Graphics Editor 404 also tells the universe 420 that a portion of it has been damaged. The universe 420 tells all the views of the damage. When the Graphics Editor 404 is done, it tells the universe 420 to update itself. The universe 420 tells all the views to repair the earlier damages, and the views then redraw the parts of the screen that needed to be updated. The box then appears on the screen. They do this by asking the universe 420 to redraw all the objects in the affected areas. The universe 420 then tells the gray box to draw itself.

Step 2: The user then clicks the button of the Operation Mouse in the gray box he or she has created. Handles appear around the box to show that it is the currently selected object and a crosshair 1710 surrounded by a box appears in the center of the gray box. This causes the Graphics Editor 404 to tell the Command Router 410 that the box object has been selected. Graphics Editor 404 then tells the object to turn on its select handles. The Command Router 410 tells the Behavior Editor 408 that there is a new selected object, and the Behavior Editor 408 creates a crosshair and default input region over the center of the box. The Graphics Editor 404 then tells the universe 420 to update the views, and the objects are drawn.

Step 3: The user then moves the Operation Mouse to the Output Function Name field 1712 of the Behavior Editor 406 and changes the "f1" to "chcolor", thereby indicating a color change. The user then moves the mouse to the Define Output button 1714 and clicks a select button of the Operation Mouse. This defines state name "chcolor" value "0" to be the current state of the gray box which, in turn, causes the Behavior Editor 408 to tell the box object to create a new behavior state function called "chcolor" and for the value "0" of that function to take the current behavior state of the object and save it. The object creates a VSE behavior object 428 that contains the function "chcolor", the value "0", and the current graphical state of the gray box. It also registers with the Behavior Router 412 that it is interested in the "chcolor" function.

Step 4: The user then moves the Operation Mouse over to the color palette 1704 and clicks and holds the select button of the Operation Mouse over a white color square. While holding down the button of the Operation Mouse, the user moves the Operation Mouse over to the background square and releases the select button of the Operation Mouse. That action changes the color of the currently selected object (box) to white. This causes the Graphics Editor 404 to change the current state of the box by changing its color to white. Graphics Editor 404 then tells the universe 420 to update and the white box is drawn.

Step 5: The user next moves the Operation Mouse to the arrows next to the Output State field 1716 and clicks the select button on the arrow pointing up. This changes the Output State 1716 to "1". The user then clicks on the Define Output button 1714, and behavior state "1" is saved with the color of the box being white. This causes the Behavior Editor 408 to tell the box object to take its current state and save it as state "1" of function "chcolor". The box object adds to its behavior object 428 a new state "1" of function "chcolor" and gives it all its current graphical state information (in this case it saves the color white). The Behavior Editor 408 also tells the Behavior Router 412 to change the state of the "chcolor" function to the value "1". Any other objects interested in "chcolor" would then be notified.

Step 6: The user next moves the Operation Mouse to the arrows next to the Output State field 1716 and toggles the state value between "0" and "1". This verifies that the output behavior works and the box changes color, alternating between gray and white. When the user changes the Output State field 1716, the Behavior Editor 408 notifies the Behavior Router 412 that function "chcolor" has changed its value. The Behavior Router 412 then notifies the box object that function "chcolor" has changed. This causes the box object to load the graphics state information for that state of "chcolor" into its current graphical state. The box object then tells the universe 420 that its area has become damaged. Finally, the Behavior Router 412 tells the universe 420 to update, which causes the universe 420 to tell the objects to repair their damaged parts. The screen is then updated so that the object has the new color.

Step 7: The user then adjusts the width and height of the box around the crosshair 1710 using the Operation Mouse until the box around the crosshair 1710 until the box is the same size as the gray box. The user has thus specified an input field to be the same size as the box object. The Behavior Editor 408 tracks the mouse operations of the user and changes the input region size accordingly.

Step 8: The user then moves the mouse to the Define Object Input region 1718 of the Behavior Editor panel and changes the field Next Function Name 1720 from "f1" to "chcolor". The user then moves the Operation Mouse down to the Example Mouse 1700 and clicks the Operation Mouse select button on the Example Mouse button 1702. The Example Mouse 1700 updates to show that its button 1702 has been depressed. The user then moves the Operation Mouse and clicks its select button on the Define Object Input button 1718. This tells the VSE system 400 that when the Example Mouse is in the input region, and the button 1702 is down, it can issue the behavior event "chcolor" with value "0".

This causes the Behavior Editor 408 to tell the box object to create an input behavior state that is bound to the given input region and the Example Mouse button 1702 being down. When this condition occurs, a behavior event is sent to the Behavior Router 412 with the name "chcolor" and value "0". The primitive object 424 adds this input behavior state to its behavior object 428.

Step 9: The user then moves the mouse to the Next State field 1722 of the Define Object Input section and clicks the Operation Mouse on the arrow next to the field changing the value from a "0" to a "1". The user then moves the Operation Mouse to the depressed button 1702 of the Example Mouse 1700 and clicks the select button on the Operation Mouse on it. This brings the button 1702 back to the up position. The user then clicks on the Define Object Input button 1718. This tells the VSE system 400 that when the Example Mouse button 1702 is released in the input region to issue the behavior event "chcolor" with value "0".

This causes the Behavior Editor 408 to tell the box object to create an input behavior state that is bound to the given input region and the left Example Mouse button 1702 being released. When this occurs thereafter, the Behavior Router 412 is sent "chcolor" and value "1". The primitive object 424 adds this to its Behavior Object 428.

Step 10: The user next moves the Operation Mouse and clicks its select button on the run diamond button 1724. This puts the VSE system 400 into run mode. In this mode, the buttons gray out (since the user cannot use them) . The button clicks on the Operation Mouse now go to the objects on the work area and not the editors.

The Behavior Editor 408 grays out its buttons and tells the Command Router 410 that a run mode command was issued. This allows other editors to gray out their buttons as well. It then tells the work area (view object 426) to send any user inputs in the work area to the universe 420.

Step 11: The user next moves the Operation Mouse over to the top of the box object which is currently white. The user then holds down the left mouse button of the Operation Mouse, and the object turns gray. The user then releases the mouse button and the object turns back to white. The user has thus created a general purpose button that has two states and any number of objects or user code can receive information about the state changes when in run mode.

When the user holds the Operation Mouse select button down over the box object, the view object 426 gets the behavior event. The user passes the event to the universe 420 which then asks its objects if they are interested in button presses in this region. The box object gets the event and issues a behavior event of "chcolor" value "0" to the Behavior Router 412. The Behavior Router 412 sends the event back to the box object. The box object then changes its graphic state which includes changing its color to gray. The universe 420 gets updated and the box is drawn in its new color. When the user releases the Operation Mouse button the same sequence of events occur again except this time with the value "1" and the box turned back to white.

Thus, in accordance with the VSE system 400 of the invention, the following steps may be taken in system development: the graphics for creating an interface to an object are created and then input and output behavior are added (as by clicks on mouse buttons). The object is then tested and saved. The user then creates the desired application code and runs the application which calls upon particular objects. The user application code is then connected to the VSE system 400 and the results displayed. The object may then be modified and saved as desired.

Although a single exemplary embodiment of the invention has been described in detail above, those skilled in the art will readily appreciate that many additional modifications are possible in the exemplary embodiment without materially departing from the novel teachings and advantages of the invention. Accordingly, all such modifications are intended to be included within the scope of this invention as defined in the following claims.

We claim:

1. A system for creating and animating graphical objects by directly manipulating said graphical objects on a display screen, the system comprising:

a graphics editor which permits a user to create and manipulate said graphical objects on said display screen;

means for animating said graphical objects by storing information representing respective manipulations of said graphical objects by said user using said graphics editor as respective behavior states of said graphical objects and recreating said manipulations by specifying stored behavior states of said graphical objects corresponding to said manipulations; and means for displaying said animated graphical objects on said display screen as display states of said graphical objects.

2. A system as in claim 1, wherein said graphics editor comprises means for grouping at least two graphical objects into a composite graphical object and for manipulating said composite graphical object.

3. A system as in claim 2, wherein said graphics editor further comprises means for creating and managing a plurality of said graphical objects and composite graphical objects.

4. A system as in claim 1, wherein said animating means comprises a behavior editor which defines each graphical object's input behavior by selectively assigning a user defined input region, behavior state name and value to a user input operation, said behavior editor further defining each graphical object's output behavior by assigning a current behavior state of each graphical object to a user defined output state name and value.

5. A system as in claim 4, wherein said behavior editor comprises means for sending a behavior state to said graphical objects by specifying said output state name and said value.

6. A system as in claim 1, wherein said animating means comprises an example mouse input device with an associated example mouse pad for defining operations done with a hardware mouse input device with an associated hardware mouse pad, said example mouse comprising:

a graphical mouse object representing said hardware mouse with said associated hardware mouse pad on said display screen; and means for manipulating said graphical mouse object so as to simulate operation of said hardware mouse.

7. A system as in claim 6, wherein said manipulating means comprises:

means for pressing and releasing one or more buttons on said example mouse pad under control of said hardware mouse and associated hardware mouse pad, a button to be depressed on said example mouse pad being selected by the user by using said hardware mouse and said button on said example mouse pad being depressed by the user by depressing a corresponding button on said hardware mouse pad; and means for moving said example mouse on its associated example mouse pad under control of said hardware mouse and associated hardware mouse pad, said example mouse being selected by the user by using said hardware mouse and being moved by moving the hardware mouse such that the example mouse is moved a corresponding amount on its associated example mouse pad on said display screen relative to the movement of said hardware mouse.

8. A system as in claim 1, further comprising a library of graphical objects which are selected by the user and manipulated by said graphics editor for display on said display screen.

9. A system as in claim 1, further comprising an interface for linking the behavior states of said graphical objects created by said graphics editor to one of (a) user defined source code and (b) an external database.

10. A system as in claim 1, further comprising means for recording and playing back behavior states of said graphical objects.

11. A method of creating and animating graphical objects by directly manipulating said graphical objects on a display screen using a graphics editor, comprising the steps of:

drawing graphical objects with said graphics editor;

manipulating said graphical objects to different display states using said graphics editor;

defining output behavior for said graphical objects for said different display states of said graphical objects;

storing the output behavior defined in said defining step with the corresponding graphical object for said different display states; and animating said graphical objects by designating display states to be displayed and then displaying the designated display states in a desired order as an animation.

12. A method as in claim 11, wherein said drawing step comprises a step of retrieving pre-drawn graphical objects having predetermined output behavior from a graphical object library.

13. A method as in claim 11, wherein said drawing step comprises a step of grouping at least two of said desired graphical objects into a composite graphical object and said manipulating step comprises a step of manipulating said composite graphical object.

14. A method as in claim 11, wherein said manipulating step comprises a step of performing at least one of moving, rotating, scaling, stretching, cutting, filling, pasting, mapping and unmapping said graphical object.

15. A method as in claim 11, wherein said defining step comprises a step of assigning respective behavior states to respective display states and said storing step comprises a step of storing said defined output behavior with a corresponding behavior state.

16. A method as in claim 15, including a further step of interpolating said output behavior for display states between respective behavior states of said animation.

17. A method as in claim 15, wherein said defining step comprises a step of defining what output behavior each graphical object has by assigning a current behavior state of each graphical object to a user defined output state name and value.

18. A method as in claim 17, wherein said animating step comprises a step of sending a behavior state to said graphical objects by specifying an output state name and said value.

19. A method as in claim 11, wherein said defining step comprises steps of defining input behavior to said graphics editor by giving a graphical object an example of a desired input to look for, and once the desired input is found, by telling the graphical object which behavior state to output or to change to.

20. A method as in claim 19, including a further step of interpolating said input behavior for input regions between respective user defined input regions.

21. A method as in claim 19, wherein said defining step comprises a step of defining what input behavior each graphical object has by assigning a user defined input region, input state name and value to a user input operation.

22. A method as in claim 11, wherein said animating step comprises a step of receiving the behavior states of said graphical objects as input from a user's application program and linking the behavior states of said graphical objects created by said graphics editor to one of (a) user defined source code and (b) an external database.

23. A method as in claim 11, comprising a further step of creating an example mouse input device with an associated example mouse pad to define operations done with a hardware mouse input device with an associated hardware mouse pad, said example mouse creating step comprising the steps of:

creating a graphical mouse object representing said hardware mouse with said associated hardware mouse pad on said display screen; and manipulating said graphical mouse object so as to simulate operation of said hardware mouse input device.

24. A method as in claim 23, wherein said manipulating step comprises the steps of:

pressing and releasing one or more buttons on said example mouse pad under control of said hardware mouse and associated hardware mouse pad, comprising the steps of selecting a button to be depressed on said example mouse pad using said hardware mouse and depressing said button on said example mouse pad by depressing a corresponding button on said hardware mouse pad; and moving said example mouse on its associated example mouse pad under control of said hardware mouse and associated hardware mouse pad, comprising the steps of selecting said example mouse using said hardware mouse and moving the hardware mouse such that the example mouse is moved a corresponding amount on its associated example mouse pad on said display screen relative to the movement of said hardware mouse.

25. A method as in claim 11, comprising further steps of saving and replaying said animation.

26. A method of defining user input to graphical objects as respective behavior states of said graphical objects, comprising the steps of:

defining at least one region on a display screen relative to each graphical object which receives user input;

describing what input event types for said at least one region relative to each of said graphical objects simulate output behavior states of said graphical objects which control output behavior for said graphical objects;

defining desired input behavior states for said graphical objects which simulate said output behavior states of said graphical objects;

storing the input behavior states defined in said input behavior states defining step with corresponding graphical objects for respective output behavior states; and applying the input behavior states defined in said input behavior states defining step to said graphical objects so as to cause a change in at least one output behavior state of at least one of said graphical objects, thereby changing a display state of said at least one of said graphical objects.

27. A method as in claim 26, wherein said region defining step comprises a step of having a user demarcate a region relative to each of said graphical objects.

28. A method as in claim 27, wherein said demarcating step comprises a step of using an example mouse input device with an associated example mouse pad which simulates operation of a hardware mouse input device with an associated hardware mouse pad for selecting said region relative to each of said graphical objects.

29. A method as in claim 26, comprising the further step of retrieving graphical objects with predetermined input behavior states from a library and assigning input behavior of retrieved graphical objects to said graphical objects being described in said describing step.

30. A method as in claim 26, wherein said describing step comprises a step of performing at least one of pressing an input device, releasing said input device, toggling said input device, and moving said input device.

31. A method as in claim 30, wherein said performing step comprises a step of selectively pressing, releasing, toggling and moving an example mouse input device with an associated example mouse pad which simulates operation of a hardware mouse input device with an associated hardware mouse pad.

32. A method as in claim 30, wherein said input behavior states defining step comprises a step of associating a graphical object with an input from said input device in said at least one region relative to said graphical object and with an input behavior state, and said storing step comprises a step of storing said association with said graphical object.

33. A method as in claim 26, wherein said applying step comprises steps of routing said user input to an appropriate graphical object and sending from said appropriate graphical object an associated input behavior state to all graphical objects so that all graphical objects have corresponding display states for said user input.

34. A method as in claim 26, comprising a further step of interpolating said defined input behavior states with said user input to create new input behavior states between previously defined input behavior states.

35. A method as in claim 26, comprising further steps of saving and replaying said user input.

36. A method of enabling a user to create and animate a graphical user interface, by providing examples of what the user intends one or more graphical objects in the graphical user interface to do in response to user input, the method comprising steps of:

creating an arbitrary graphical user interface, using a graphics editor, by first drawing the graphical user interface as a collection of first states of graphical objects, said first states including a first state of a first graphical object;

manipulating the first graphical object, via the graphics editor, to a second state of the first graphical object, wherein together, the first state of the first graphical object, the second state of the first graphical object, and the manipulation, define an exemplary output behavior for the first graphical object;

connecting user input to the exemplary output behavior for the first graphical object; and animating the first graphical object in response to the user input.

37. A method as in claim 36, wherein the user input is application code.

38. A method as in claim 36, wherein:

the first state of the first graphical object corresponds to a first frame in an animation sequence; and the second state of the first graphical object corresponds to a second frame in the animation sequence; and wherein the method further comprises a step of:

generating additional frames of the animation sequence by interpolating the exemplary output behavior for the first graphical object.

39. A method as in claim 36, wherein the step of manipulating the first graphical object to a second state comprises a step of performing at least one of moving, rotating, scaling, stretching, cutting, filling, pasting, mapping and unmapping the first graphical object.

\* \* \* \* \*